(12) United States Patent
Clark et al.

(10) Patent No.: US 8,851,404 B2
(45) Date of Patent: Oct. 7, 2014

(54) HARD DRIVE SHREDDING DEVICE

(75) Inventors: Kevin P. Clark, Carbondale, IL (US);
Argus C. Tong, Yorba Linda, CA (US);
Robert T. Gallegly, Carbondale, IL
(US); Kevin M. Hubbard, Edwardsville,
IL (US)

(73) Assignee: Serenity Data Services, Inc.,
Carbondale, IL (US)

( * ) Notice: Subject to any disclaimer, the term of this patent is extended or adjusted under 35 U.S.C. 154(b) by 377 days.

(21) Appl. No.: 13/272,472

(22) Filed: Oct. 13, 2011

(65) Prior Publication Data
US 2012/0091237 A1    Apr. 19, 2012

Related U.S. Application Data

(60) Provisional application No. 61/392,752, filed on Oct. 13, 2010.

(51) Int. Cl.
*B02C 19/00* (2006.01)
*G11B 5/024* (2006.01)

(52) U.S. Cl.
CPC .................................. *G11B 5/0245* (2013.01)
USPC .................................. 241/18; 241/23; 241/30

(58) Field of Classification Search
CPC .................. B02C 2018/0015; B02C 25/00
USPC .................................................. 241/18, 23, 30
See application file for complete search history.

(56) References Cited

U.S. PATENT DOCUMENTS

| 4,721,257 | A | | 1/1988 | Williams et al. |
|---|---|---|---|---|
| 4,779,810 | A | | 10/1988 | Frey |
| 5,064,126 | A | | 11/1991 | Hickey et al. |
| 5,236,139 | A | | 8/1993 | Radtke |
| 6,039,637 | A | * | 3/2000 | Hutchison et al. ............ 451/271 |
| 6,375,106 | B1 | | 4/2002 | Sears |
| 6,588,691 | B2 | | 7/2003 | Yamamoto et al. |
| 6,685,119 | B2 | * | 2/2004 | Castronovo ................ 241/260.1 |
| 6,695,240 | B2 | | 2/2004 | Rajewski |
| 7,090,156 | B2 | | 8/2006 | Castronovo |
| 7,090,214 | B2 | | 8/2006 | Castronovo |
| 7,100,852 | B2 | | 9/2006 | Castronovo |
| 7,175,116 | B2 | | 2/2007 | Castronovo |
| 7,198,213 | B2 | | 4/2007 | Kolbet et al. |
| 7,204,436 | B2 | | 4/2007 | Castronovo |
| 7,240,864 | B2 | | 7/2007 | Castronovo |
| 7,308,543 | B2 | | 12/2007 | Kishi |
| 7,311,277 | B2 | | 12/2007 | Watanabe et al. |
| 7,334,747 | B2 | | 2/2008 | Castronovo |
| 7,357,340 | B2 | | 4/2008 | Castronovo |
| 7,363,317 | B2 | | 4/2008 | Meliksetian et al. |
| 7,427,040 | B2 | | 9/2008 | Castronovo |
| 7,448,562 | B2 | | 11/2008 | Castronovo |
| 7,562,836 | B2 | | 7/2009 | Langston |
| 7,588,206 | B2 | | 9/2009 | Hausman et al. |
| 7,607,598 | B2 | | 10/2009 | Castronovo |

* cited by examiner

*Primary Examiner* — Mark Rosenbaum
(74) *Attorney, Agent, or Firm* — Alix, Yale & Ristas, LLP

(57) ABSTRACT

A method and apparatus for destroying data on a hard drive having at least one platter on which data is stored extending from a central hub comprising. The platters are shredded while leaving at least substantially all of said hub unshredded. One or two cutting tools may be used.

10 Claims, 25 Drawing Sheets

HARD DRIVE SHREDDING DEVICE

CROSS-REFERENCE TO RELATED APPLICATIONS

This application claims the benefit of U.S. Provisional Patent Application No. 61/392,752, entitled "Hard Drive Shredding Device", filed Oct. 13, 2010, the disclosure of which is incorporated herein by reference in its entirety.

TECHNICAL FIELD

This application relates generally to a device for destroying the data on a hard drive and more particularly, to a device for shredding the data collecting platters of the hard drive so that the data thereon is completely destroyed.

BACKGROUND

Various types of data are stored on the hard drives of computers. Such data may include personal confidential information concerning individuals. This data may include their social security numbers, financial information, health information and private telephone numbers as examples. The hard drives are also used to store corporate information which may include proprietary information such as developing products, customer lists, and business plans. The government may store confidential information including highly classified information on the hard drives.

When it is desired to replace the computer, the data must be removed from the hard drive so that it cannot be misused by unscrupulous individuals. Merely erasing the data by using the computer commands is not sufficient as the data can be recaptured. This is true even if the hard drive is removed for upgrade purposes. However, even if the hard drive is removed, something must be done to destroy the data.

One way of ensuring that the data cannot be used or recovered from an unwanted hard drive is to completely destroy the hard drive. This has been accomplished in the past by completely shredding the entire hard drive. However, as the hard drive is encased in a metal, the complete destruction involves the shredding of a relatively large volume of metal that requires a lot of energy. It is thus desirable to have a process and apparatus for destroying the data on a hard drive that is more energy efficient.

SUMMARY

According to one aspect there is provided a method of destroying data on a hard drive having at least one platter on which data is entered and surrounding a central hub comprising shredding the at least one platter, and leaving at least substantially all of the hub unshredded.

According to another aspect there is provided an apparatus for destroying data on a hard drive having at least one platter on which data is stored and surrounding a central hub and comprising at least one cutting tool for shredding the platters and means for moving said hard drive or said at least one cutting tool so that the at least one platter is shredded by said cutting tool while at least substantially all of the hub remains unshredded.

DETAILED DESCRIPTION

Figure 1:
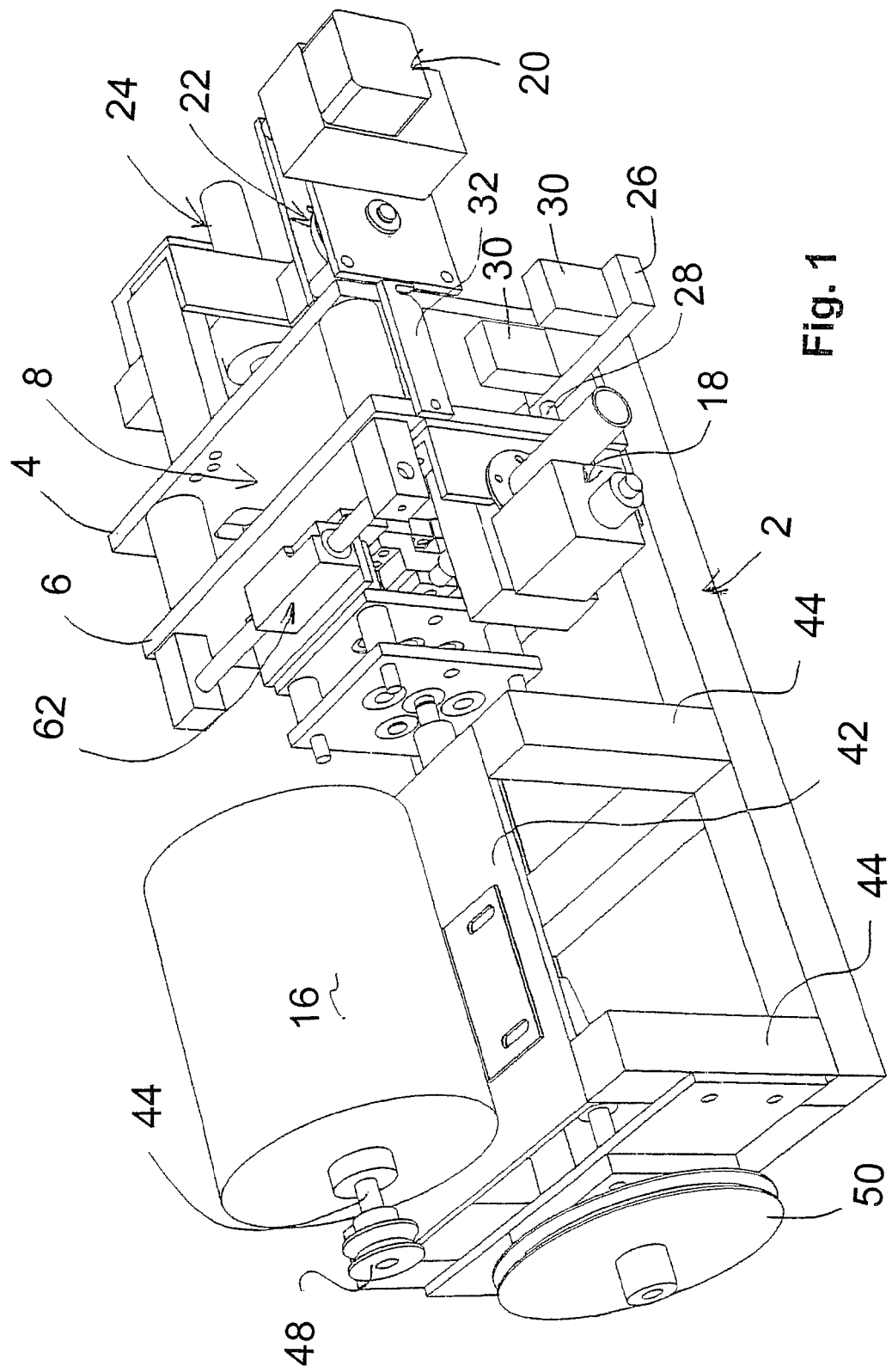
FIG. 1 is an isometric view of a hard drive shredder.
Figure 2:
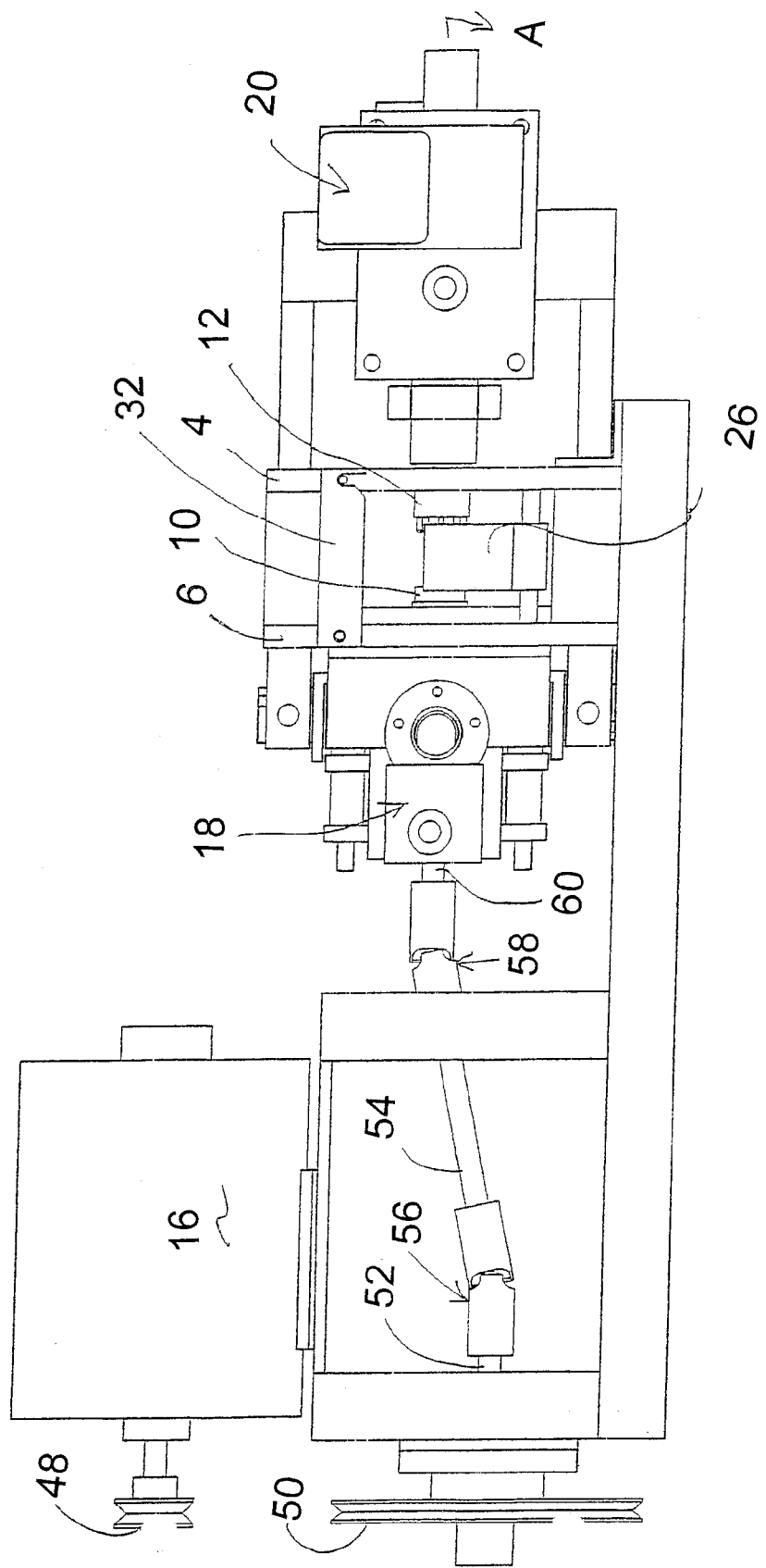
FIG. 2 is a front side view of the hard drive shredder.

Referring to the drawings, the shredding device comprises a frame 2 having spaced parallel plates 4 and 6 mounted thereon to define a chamber 8 there between to receive the hard drive to be shredded. A thrust spindle 10 extends into the chamber from one of the spaced plates 6 and a spindle head 12 is coaxially mounted with respect to the thrust spindle 10 and extends into the chamber from the other plate 4. The thrust spindle 10 is rotatably mounted in the plate 6 while the spindle head 12 is rotatably mounted in the plate 4 and is also mounted for axial movement toward and away from the thrust spindle 10.

A milling cutter 14 (FIG. 4), or other appropriate cutting tool, extends into the chamber 8 from the plate 6 and is transversely spaced from the thrust spindle 10. The milling cutter 14 is mounted for rotation about an axis parallel to the axis of the thrust spindle 10 and spindle head 12 and also for movement in a horizontal plane such that its axis is moveable toward and away from the axis of the thrust spindle 10 and spindle head 12. A motor 16 is provided for rotating the milling cutter 14 while a linear actuator 18 is provided for imparting the horizontal movement to the milling cutter.

The spindle head 12 is rotated by means of an electric motor 20 and drive connection 22. Axial movement is imparted to the spindle head 12 by a linear actuator 24.

A stop plate 26 is pivotally mounted on a shaft 28 extending between the two opposed plates 4 and 6 and includes stop blocks 30 extending from the stop plate 26. The stop plate 26 is pivotal in an upward direction such that the stop blocks 30 extend into the chamber 8. A gate latch 32 (FIG. 13) is provided which extends between the two plates 6 and 8 when the stop plate 26 is in its raised position with one end 34 being pivotally connected to the outer edge of one of the plates 6 and the other end 36 having a U-shaped cutout 38 which is adapted to hook around a bolt 40 extending into the outer edge of the other plate member 8. The gate latch 32 serves to hold the stop plate 26 in its raised position with the stop blocks 30 extending into the chamber 8.

More specifically, the motor 16 which drives the milling cutter 14 is mounted on a frame plate 42 attached to four legs 44 of the frame 2. The motor 16 includes an output shaft 46 having a motor pulley 48 thereon. A drive pulley 50 is provided directly below the motor pulley 48 and is drivingly connected to the motor pulley 48 by an appropriate drive belt (not shown).

Figure 3:
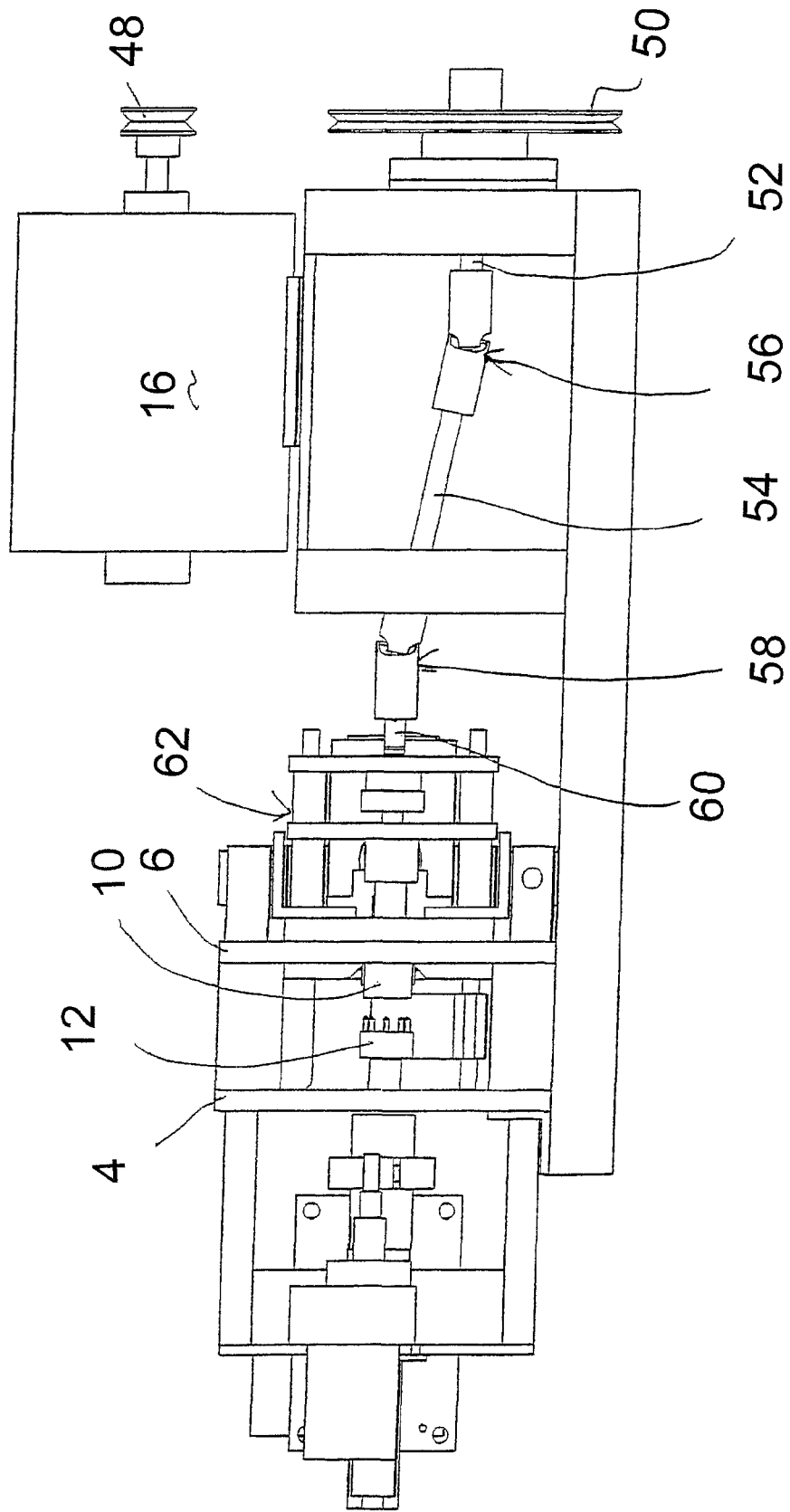
FIG. 3 is a rear side view of the hard drive shredder.

The drive pulley 50 is connected through a series of drive shafts, universal joints and gear arrangement to the mill cutter. As shown in FIG. 3, a first drive shaft 52 shaft extends from the drive pulley 50 to a second drive shaft 54 and is connected thereto by a first universal joint 56. The second drive shaft 54 is interconnected by a second universal joint 58 to a third drive shaft 60. The third drive shaft 60 is connected at one end to the second universal joint 58 and has its other end mounted in a bearing secured in a slide assembly 62. The slide assembly 62 is mounted on the frame 2 for transverse reciprocal sliding motion with respect thereto in a horizontal direction. A gear 64 is secured to the third drive shaft 60 adjacent the end of the drive shaft 60 that is mounted in the slide assembly 62.

Figure 5:
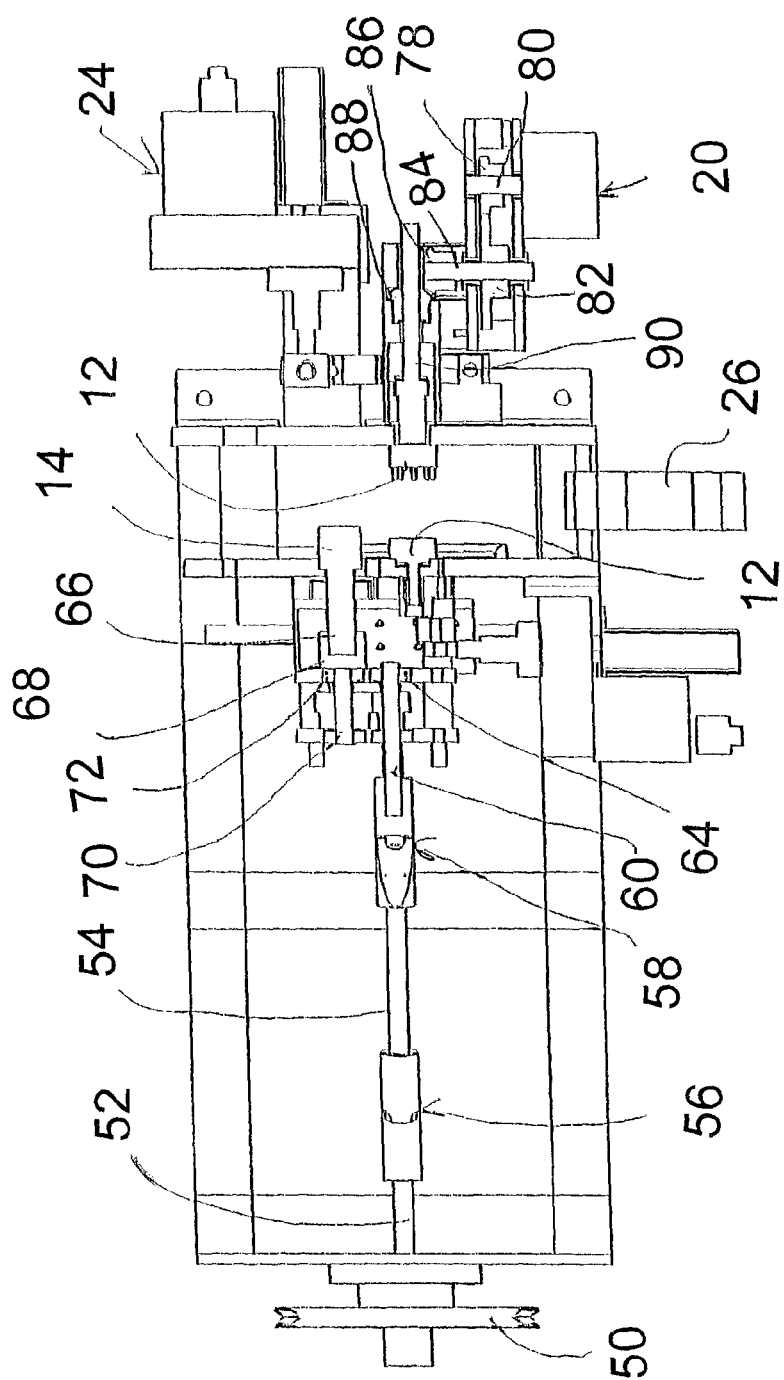
FIG. 5 is a sectional view taken along the lines A-A of FIG. 2.
Figure 6:
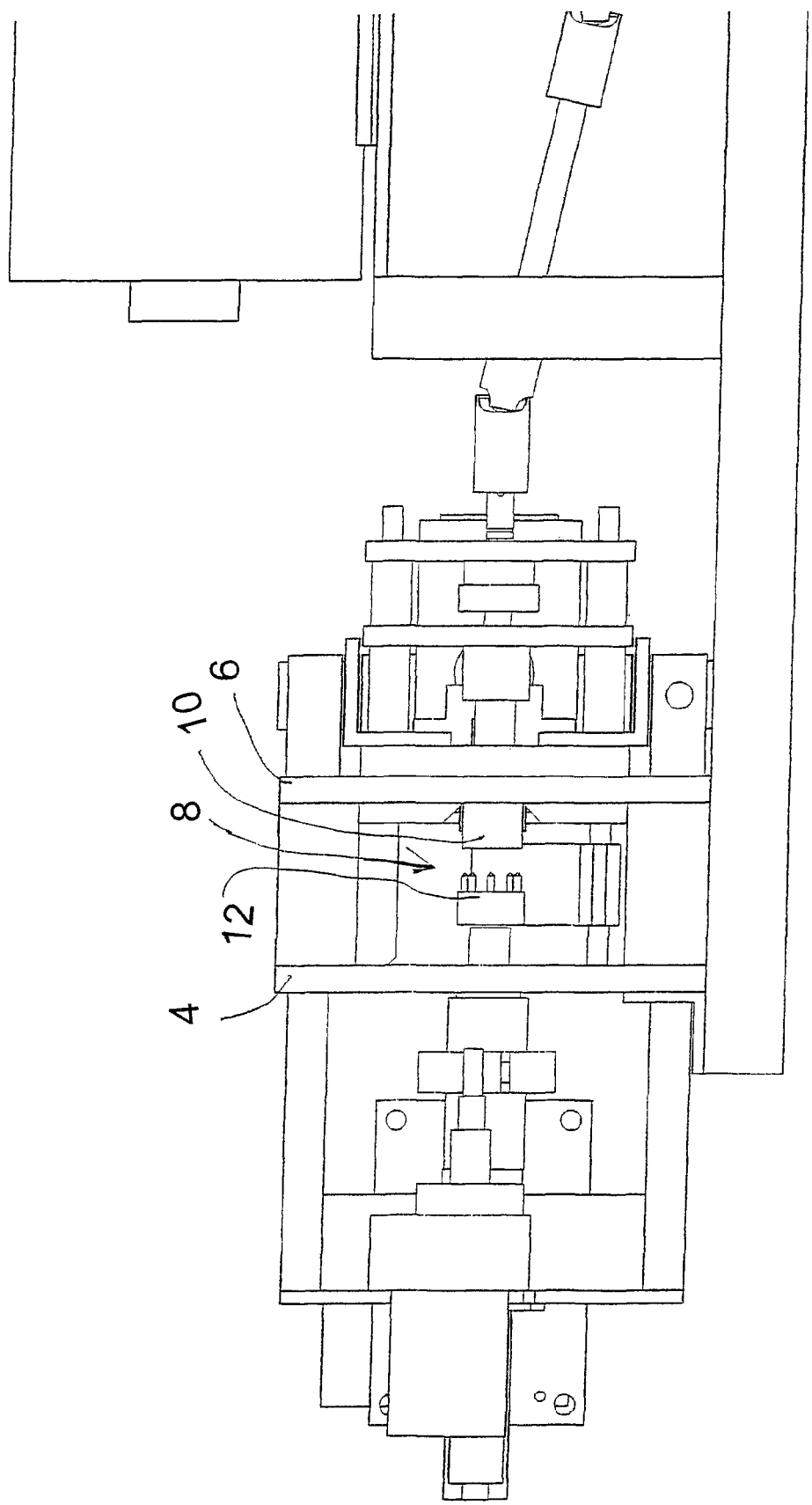
FIG. 6 is a side view of a portion of the shredder showing the spindle head in its position where it has engaged a hard drive (the hard drive is not shown)
Figure 7:
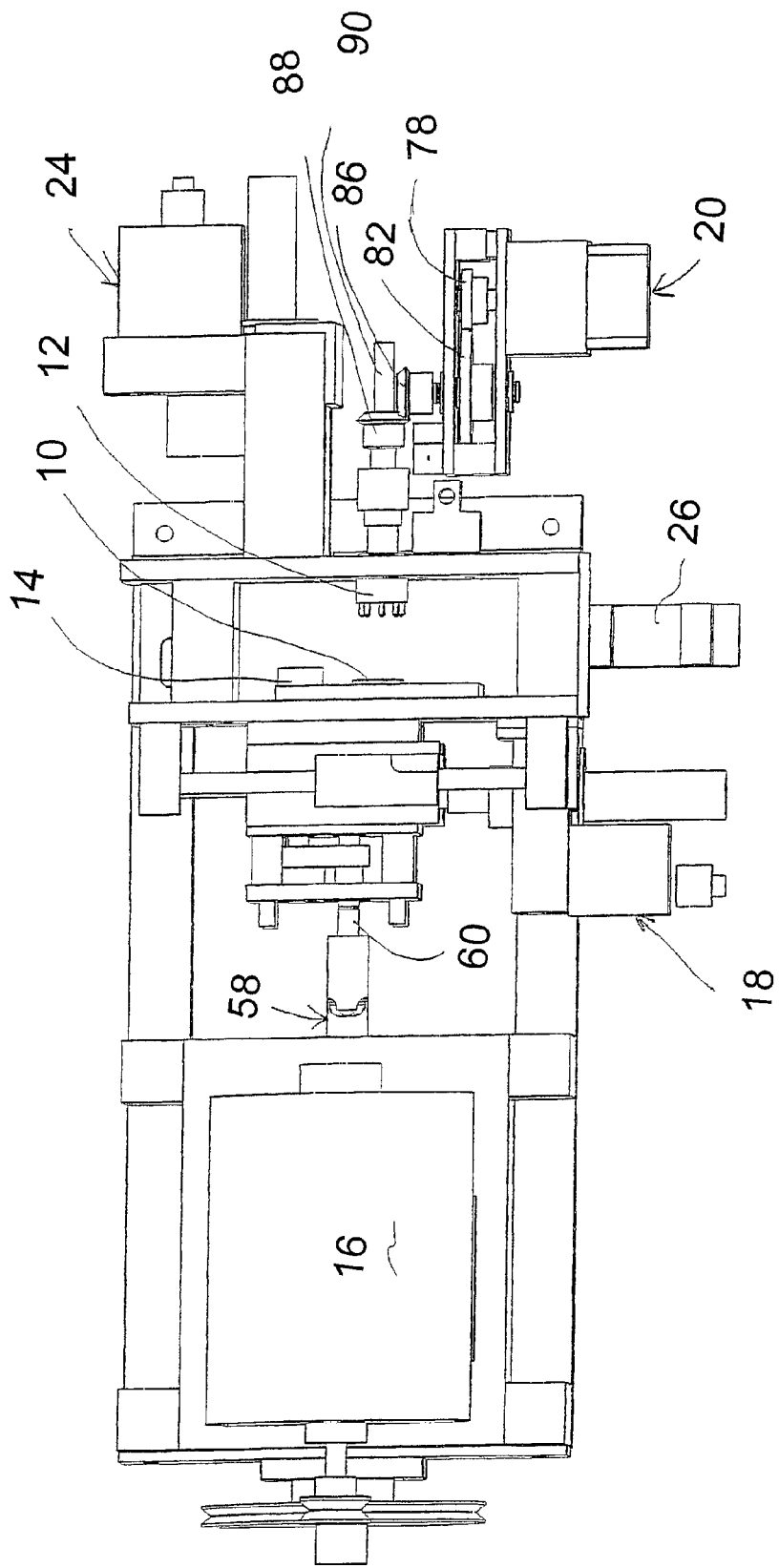
FIG. 7 is a top plan view with a portion of the shredder eliminated to show the drive for the spindle head.

As shown particularly in FIG. 5, the milling cutter 14 has a rearward extending shaft 66 that extends into an adapter 68 mounted in the slide assembly 62. A shaft 70 extends from the adapter 68 in a direction away from milling cutter 14. The shaft 70 has a gear 72 attached thereto which is in engagement with the gear 64 on the third drive shaft 60. With this arrangement, the milling cutter 14 is rotated by the motor 16 through the drive shafts 52, 54 60 interconnected by the universal joints 56 and 58, meshing gears 64 and 72, shaft 70 and adapter 68 connected to the shaft 66 of the milling cutter 14, while being capable of being moved transversely in a horizontal direction by the slide assembly 62.

The motor 16 which drives the milling cutter 14 may be of any suitable type capable of imparting suitable rotation and torque to the mill cutter 14. By way of example the motor may be Worldwide Electric model CM2-36-56 which is a two horsepower, 3450 RPM 115/240 BAC compression motor.

The transverse horizontal movement of the milling cutter 14 is provided by a linear actuator 18 mounted on the side of the frame 2. The linear actuator 18 includes an actuator arm 76 which is reciprocal along its axis and has a distal end connected to the slide assembly 62. The linear actuator 18 is electrically actuated with the arm 76 reciprocating in an axial direction such that the slide assembly 62 is moved in a direction toward and away from the axis of the thrust spindle. The milling cutter 14 is mounted in the slide assembly 62 so that upon movement of the actuator rod in an axial direction, the milling cutter 14 is moved toward and away from the axis of the thrust spindle 10.

The linear actuator 18 for moving the milling cutter 14 in a transverse, horizontal direction may be any suitable actuator having a sufficient stroke and force to properly the move the milling cutter 14. An example of such an actuator is a 3 7/16 inch stroke 120 VAC linear actuator manufactured by Gentech Inc. and sold by Surplus Center of Lincoln, Nebr. under Item #5-1580.

Figure 4:
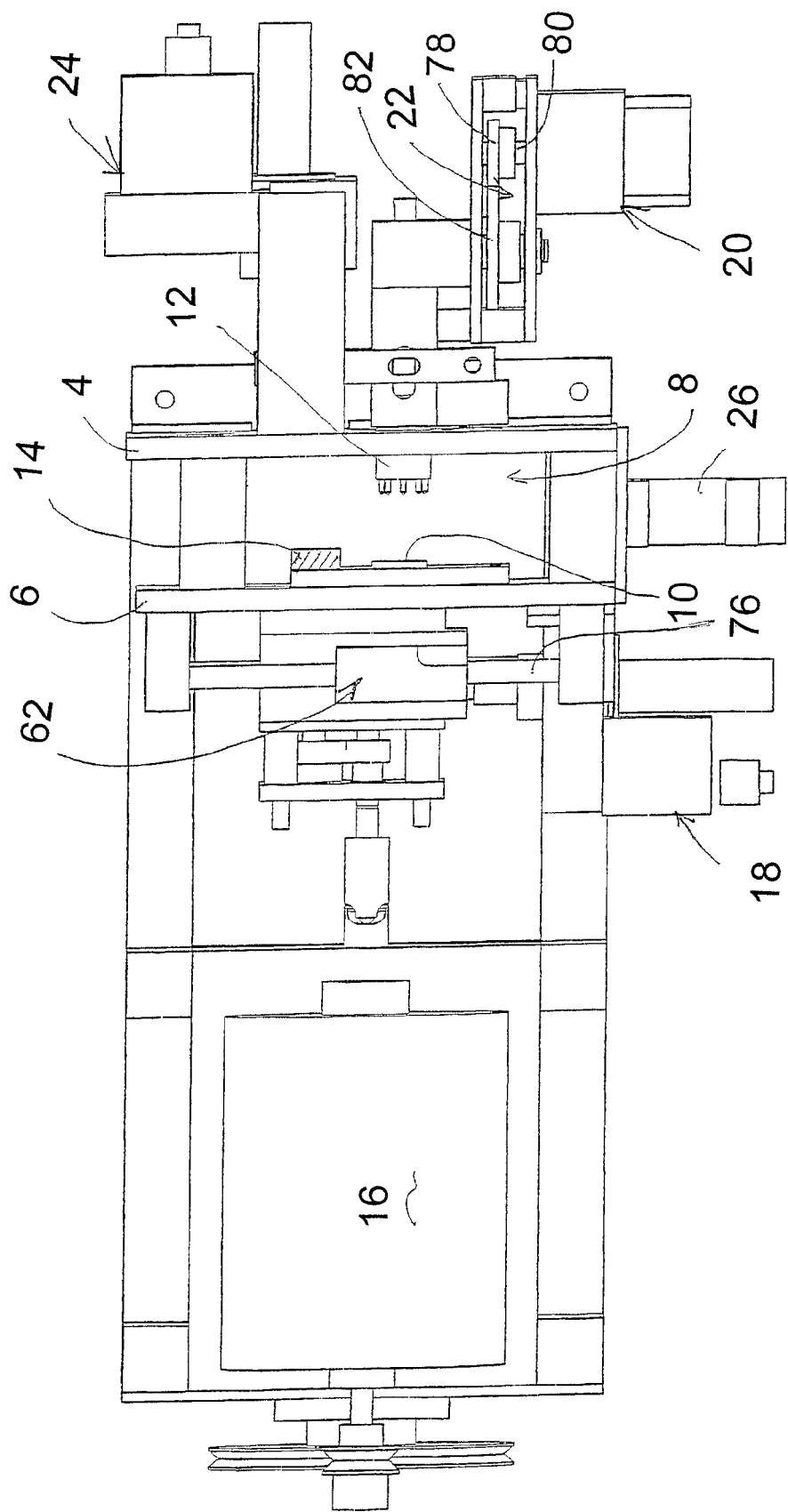
FIG. 4 is a top view of the hard drive shredder.

As shown in FIGS. 4 and 5, the spindle head 12 is rotated by means of the motor 20 that has a drive gear 78 attached to its drive shaft 80. The gear 78 meshes with a gear 82 mounted at one end of a shaft 84 extending parallel to the drive shaft 80 of the motor 20 and having a bevel gear 86 positioned at the other end of the shaft. The bevel gear 86 meshes with a bevel gear 88 mounted on a shaft 90 connected to and extending from the spindle head 12 such that rotation of the drive gear 78 of the motor, in turn, drives the gear 82 driving the bevel gear 86 which, in turn, drives the bevel gear 88 on the shaft 90 connected to the spindle head 12 causing the rotation thereof.

The motor 20 for rotating the spindle head 12 may be any suitable motor that provides the proper speed and necessary torque for turning the spindle head 12. By way of example, such motor may be 1.0 RPM, torque 100, 115V, open motor manufactured by Dayton, model no. 1 LNG2, and sold by W.W. Grainger, Inc. of Lake Forest, Ill.

Figure 8:
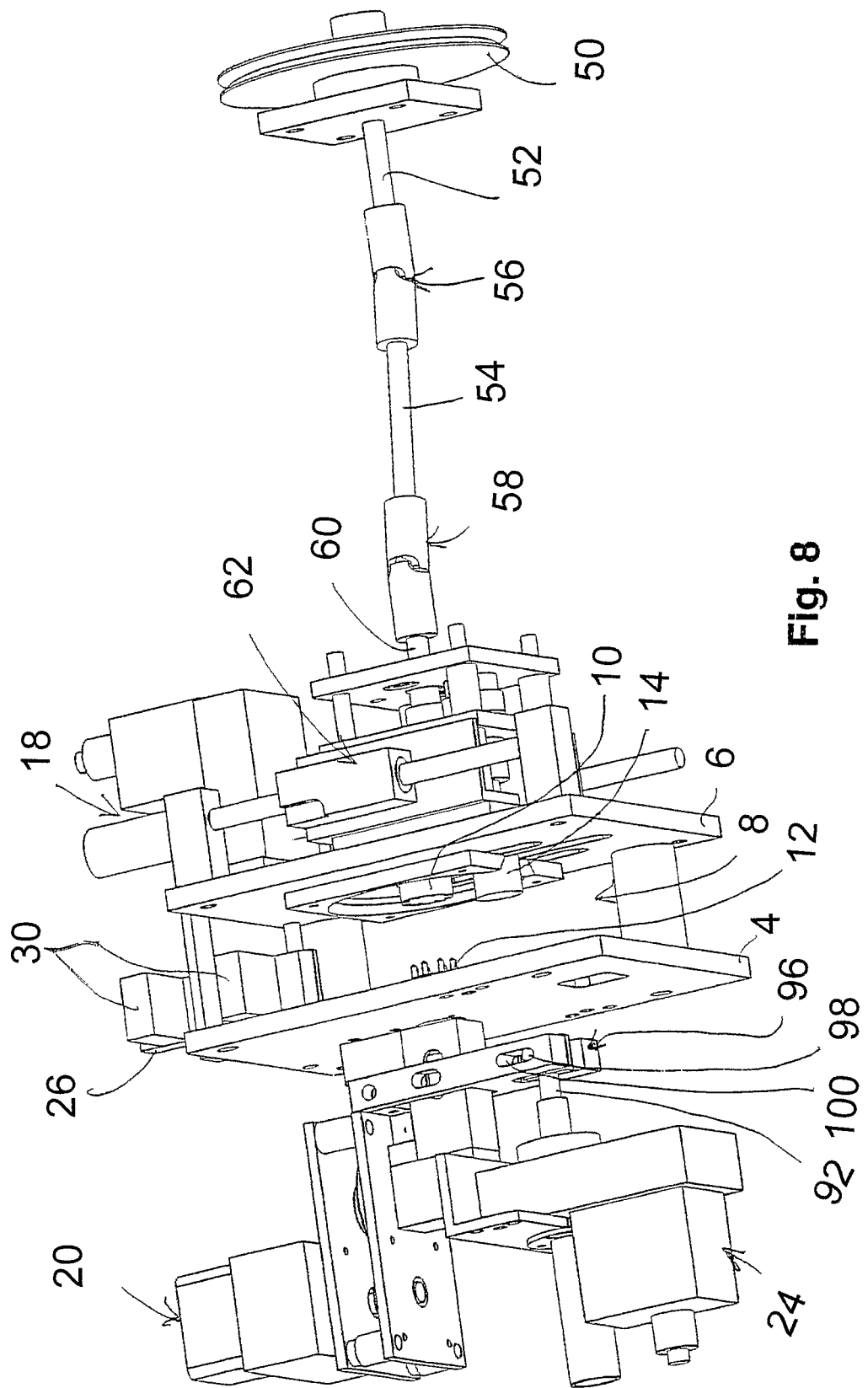
FIG. 8 is an isometric view with a portion of the shredder eliminated to show the linear actuator used to move the spindle head.

The spindle head 12 is moved in an axial direction toward and away from the thrust spindle 10 by means of a linear actuator 24 that is mounted on the frame and has an actuator rod 92 extending coaxially with the axis of the spindle head 12. As shown in FIG. 8, the actuator rod 92 has its distal end 94 attached to an H-shaped clamping member 96 by means of a dowel 98 extending through an elongated slot 100 in the clamping member and through an opening in the distal end 94 of the actuator rod. The shaft 90 of the spindle head 12 extends through a thrust coupler 102 (FIG. 5) that is mounted in the clamping member 96 which allows the spindle head shaft to rotate relative to the clamping member 96 but imparts axial movement to the spindle head shaft 90 when the actuator rod 92 is moved in its axial direction.

Any suitable linear actuator may be used for imparting the axial movement to the spindle head 12 that is capable of providing the necessary thrust toward the thrust spindle. An example of one such actuator is a 1.65 inch, 115 VAC, linear actuator manufactured by Hepa Company and sold by Surplus Center of Lincoln, Nebr. under item number 5-1463.

Figure 9:
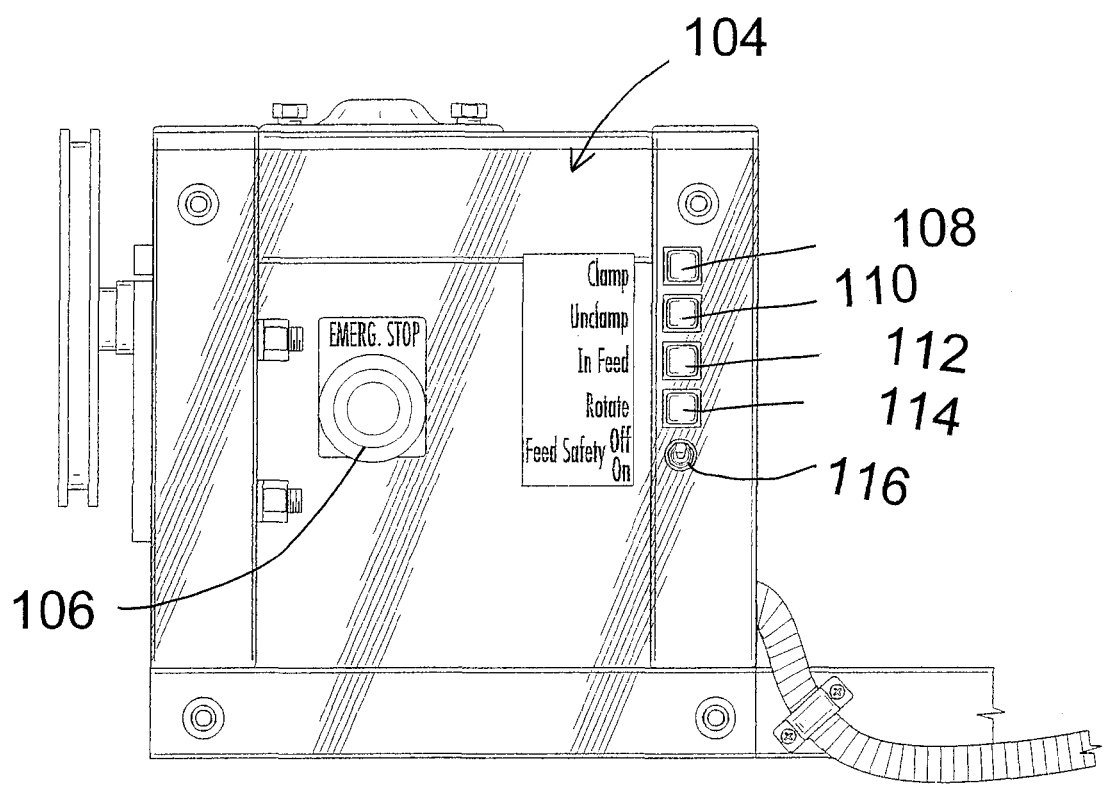
FIG. 9 is a side view of the shredder showing the mounting of various electronic switches.

As shown in FIG. 9, a control panel 104 may be mounted on the frame 2 and include an emergency stop button 106 as well as a clamping switch 108 and an unclamping switch 110. Also included are an in feed switch 112 and a rotate switch 114. A feed safety toggle switch 116 is provided that is moveable between an on and off position.

Figure 15:
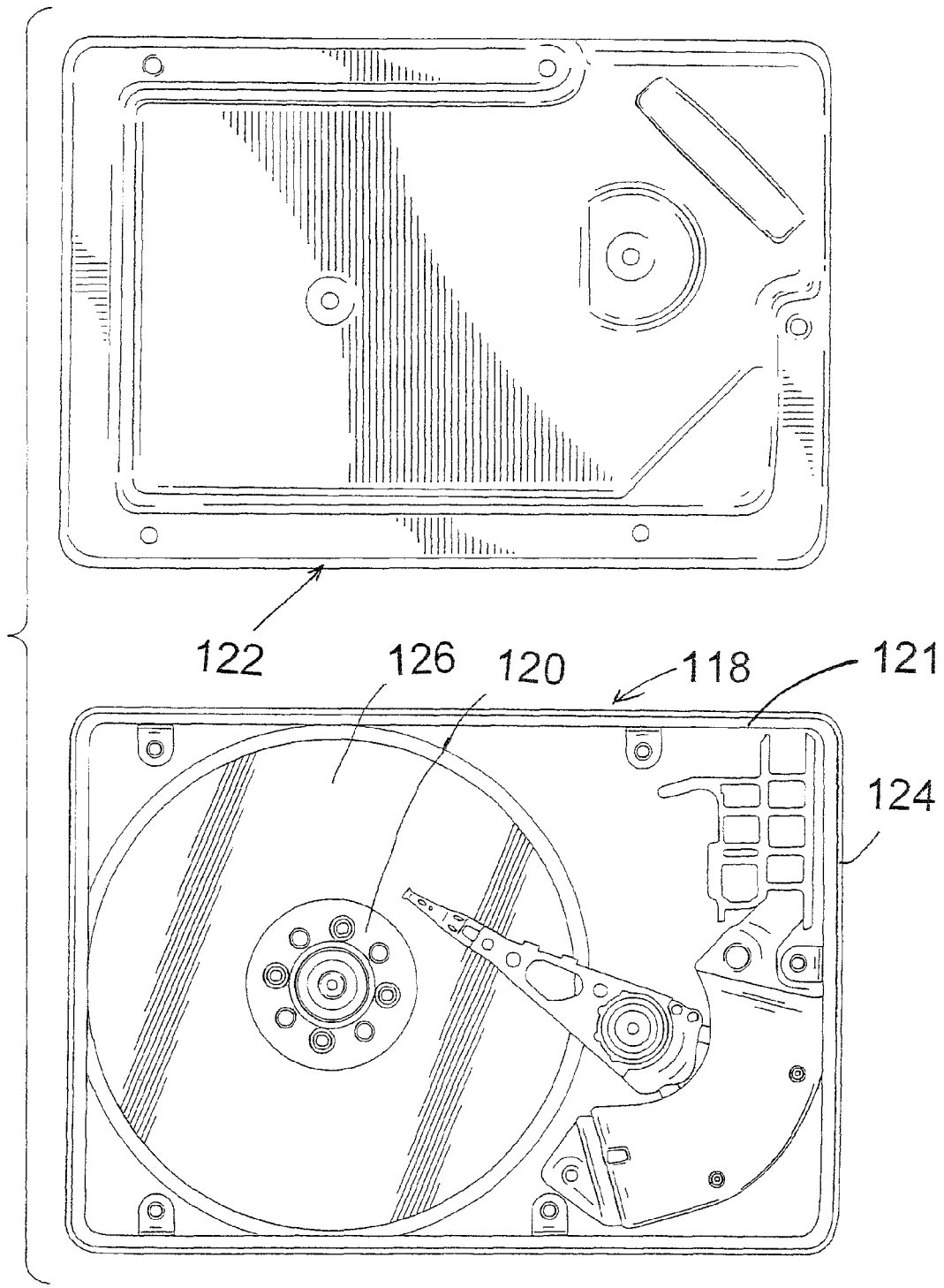
FIG. 15 is a plan view of a hard drive with the cover removed.
Figure 16:
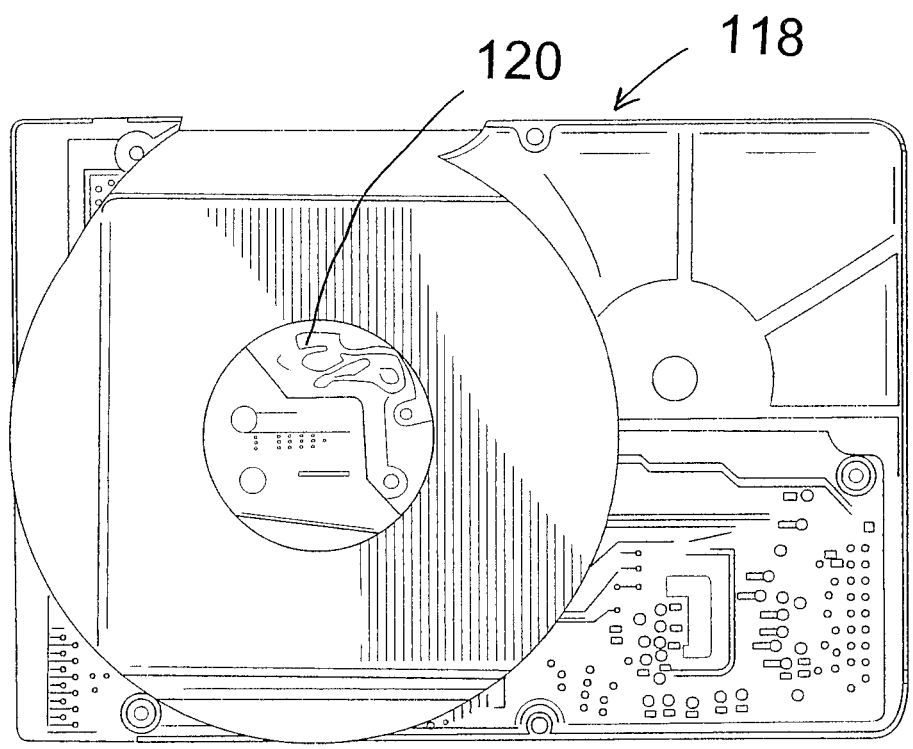
FIG. 16 is a top plan view of a hard drive after the platters have been shredded.

In general, as shown in FIG. 15, the hard drive 118 includes generally a central rotatable hub or spindle 120 mounted in a casing 121, a cover 122 (shown removed) and an end 124 with connector pins. At least one data receiving platter 126 having a surface upon which data is written is attached to and surrounds the central hub 120. The shredding device serves to shred the data receiving platters 126 and reduce it to shards so nothing remains in a physical condition from which any data can be retrieved. The hub 120 is not shredded.

Figure 10:
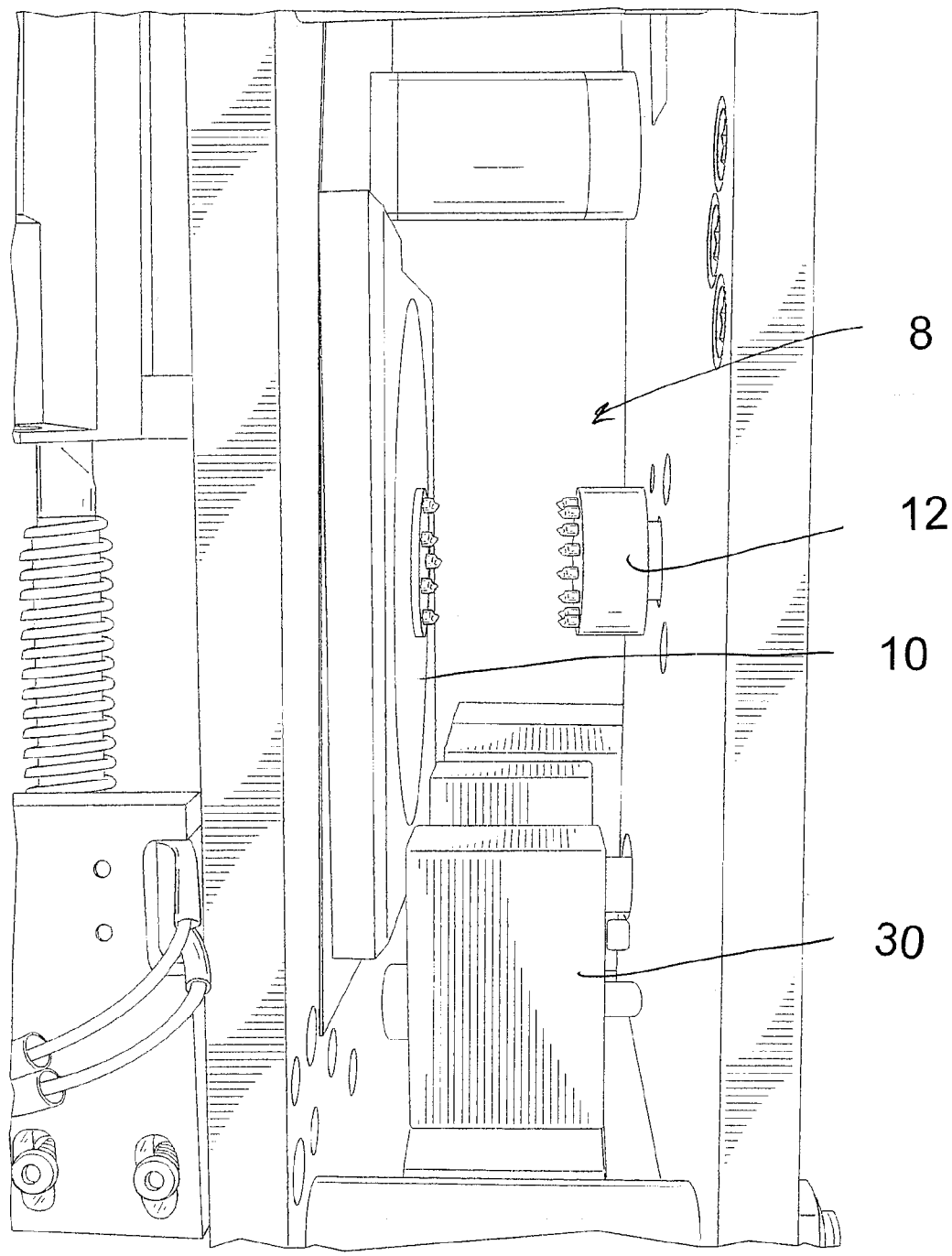
FIG. 10 is a top plan view of the shredder showing the chamber with the stop plate raised.
Figure 11:
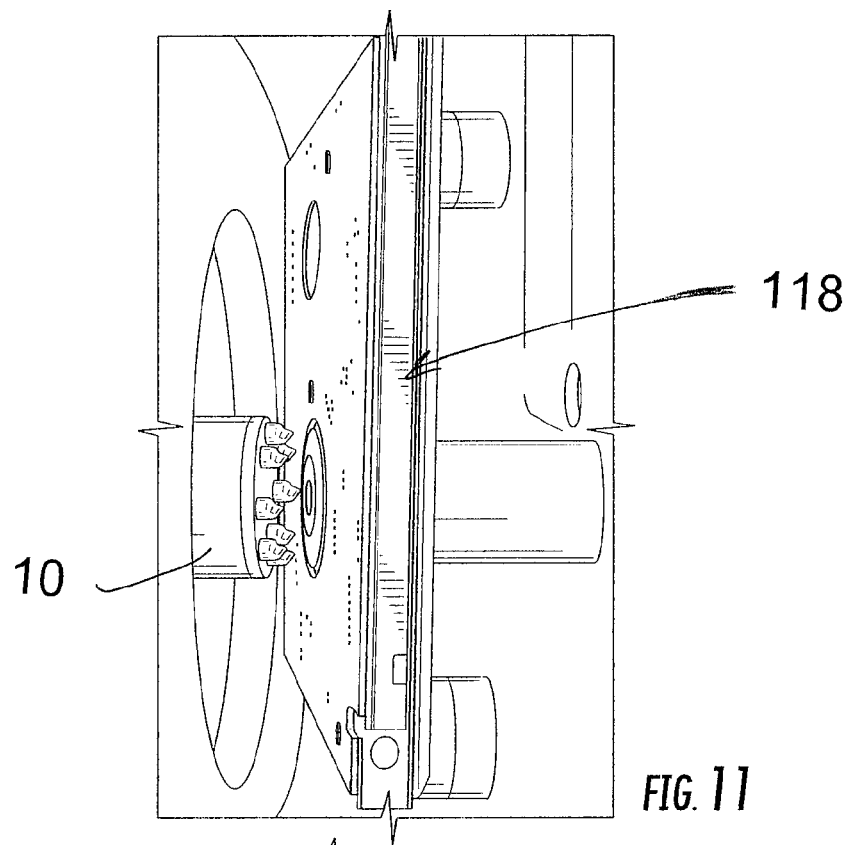
FIG. 11 is a side view showing a hard drive being inserted into the chamber between the thrust spindle and the spindle head.
Figure 13:
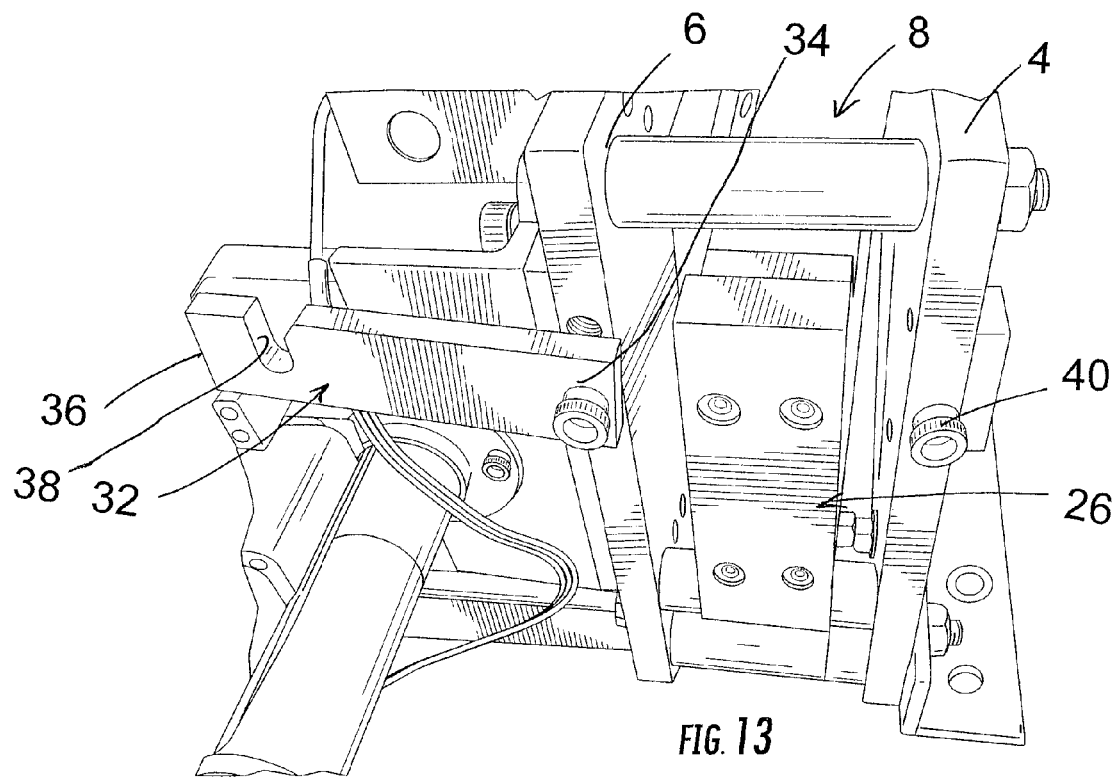
FIG. 13 is an isometric side view showing the stop plate in its raised position, but with the gate latch opened.
Figure 14:
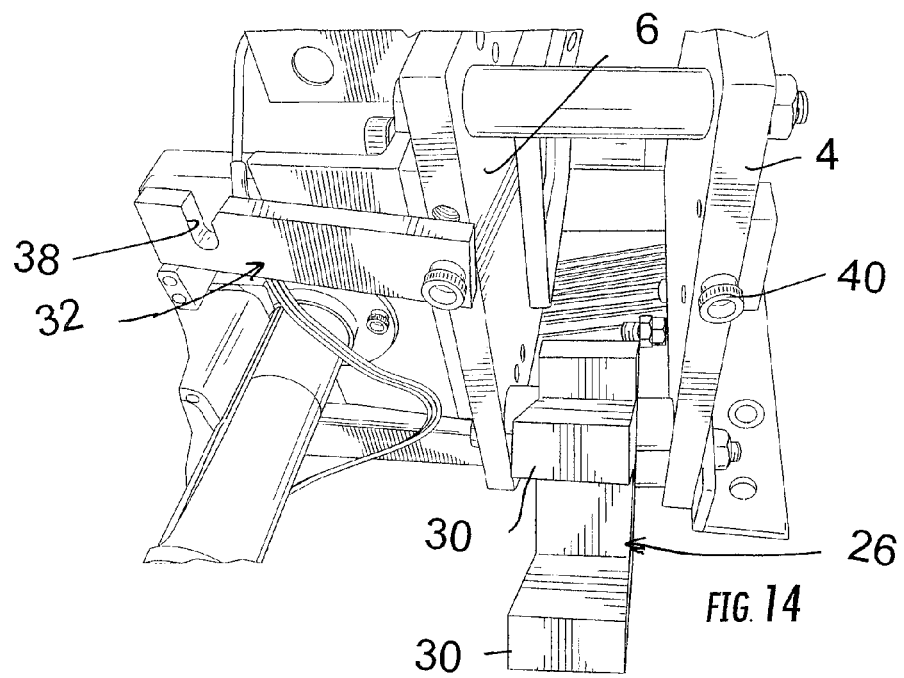
FIG. 14 is a view similar to FIG. 13 showing the gate latch opened and the stop blocks rotated out of the chamber.

To shred the hard drive 118, the feed safety toggle switch 116 on the control panel 104 is flipped to the on position and the emergency stop button 106 is pulled out. The stop plate 26 is positioned in its up position as shown in FIGS. 10 and 13, held in place by the gate latch 32, with the stop blocks 30 extending into the chamber 8. The hard drive 118 is positioned in the chamber 8 such that the cover 122 faces toward the thrust spindle 10 and the end 124 with the connector pins faces upwardly. The hard drive 118 is slid into engagement with the stop blocks 30 to center the hard drive 118 horizontally. The hard drive 118 is inserted so that its hub 120 is centered on the axis of the thrust spindle 10 and spindle head 12 as shown in FIG. 11.

Figure 12:
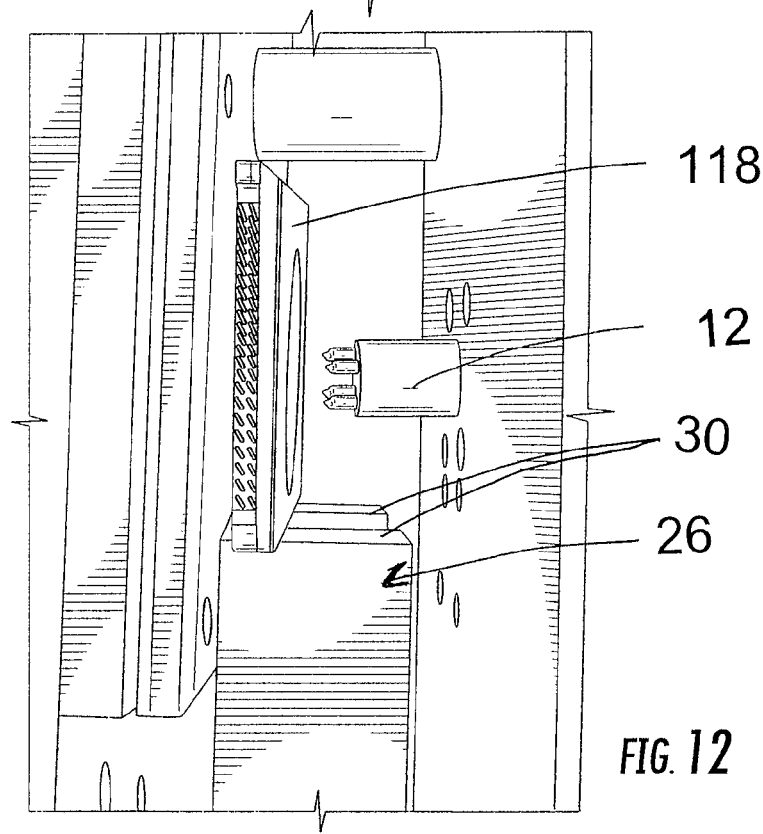
FIG. 12 is a top view showing the spindle head being moved into engagement with the hard drive to clamp the hard drive.

At this point, the clamp switch 108 located on the control panel 104 is depressed and held to cause the spindle head 12 to move toward the thrust spindle 10 clamping the hard drive between the thrust spindle 10 and the spindle head 12 as shown in FIG. 12. The spindle head 12 and thrust spindle 14 are provided with pins 130 for engaging the hard drive 118.

The feed safety toggle switch 116 is toggled to the off position which will permit the milling cutter 14 to be moved. The in feed button 114 is depressed and released which will commence the shredding cycle. This causes the linear actuator 18 to move the rotating milling cutter 14 in a transverse direction toward the axis of the thrust spindle 10. The transverse movement of the milling cutter 14 is completed when the milling cutter 14 has cut into the hard drive 118 to a point adjacent the hub 120 of the hard drive 118 at which time the horizontal movement of the milling cutter 14 is discontinued. A limit switch (not shown) may be provided to limit the transverse movement of the milling cutter 14.

At this point, the gate latch 32 is opened and the stop plate 26 is rotated into its down position withdrawing the stop blocks 30 from the chamber 8 permitting the hard drive 8 to be rotated about the axis of the thrust spindle 10. The rotate button 114 on the control panel 104 is pushed and released to initiate the rotation of the spindle head 12 which in turn rotates the hard drive 118 around the axis of its hub 120 so that the milling cutter 14 cuts a circular path around the hub axis.

After the hard drive 118 is rotated 360 degrees, completely shredding the hard drive platters 126, the milling cutter 14 returns to the start position. The main drive motor shuts off and the feed safety toggle switch 116 is switched to the on position. The unclamp button 110, located on the control panel 104, is pressed and held until the spindle head 12 is fully retracted back to its initial position.

To provide for different size hard drives, the thrust spindle 10 and spindle head 12 are replaceable with spindles of different sizes. Additionally, the stop plate 26 is replaceable with one having stop blocks 30 of the correct size. The limit switch (not shown), setting the limit of the in feed horizontal movement of the milling cutter, can also be moved to accommodate hard drives of different dimensions.

Figure 17:
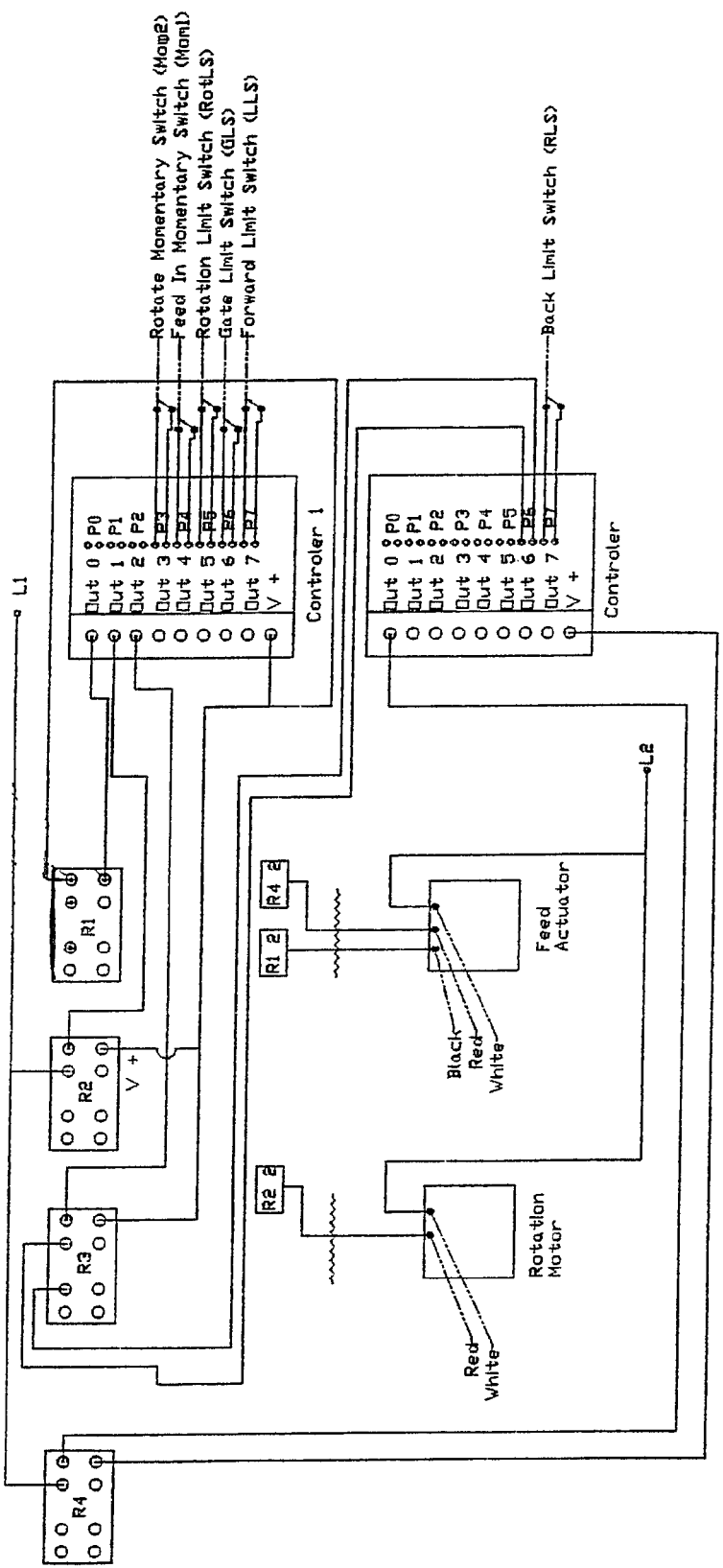
FIGS. 17, 18 and 19 are schematic drawings of various circuitry.

FIG. 17 is a schematic circuit diagram for the controller. This circuit accepts input from the operator which is directed to the controller to initiate the hard drive shredding process. The circuit also directs input from limit switches to the controller to monitor the rotational position of the hard drive indexing unit, the position of the hard drive in-feed unit, and the hard drive positioning gate. These input states are used by the controllers to control the feed actuator and the rotation motor. The feed actuator translates the cutter into the hard drive in order to effect shredding. The rotation motor rotates the hard drive while engaged with the cutter in order to assure complete hard drive platter destruction.

Figure 18:
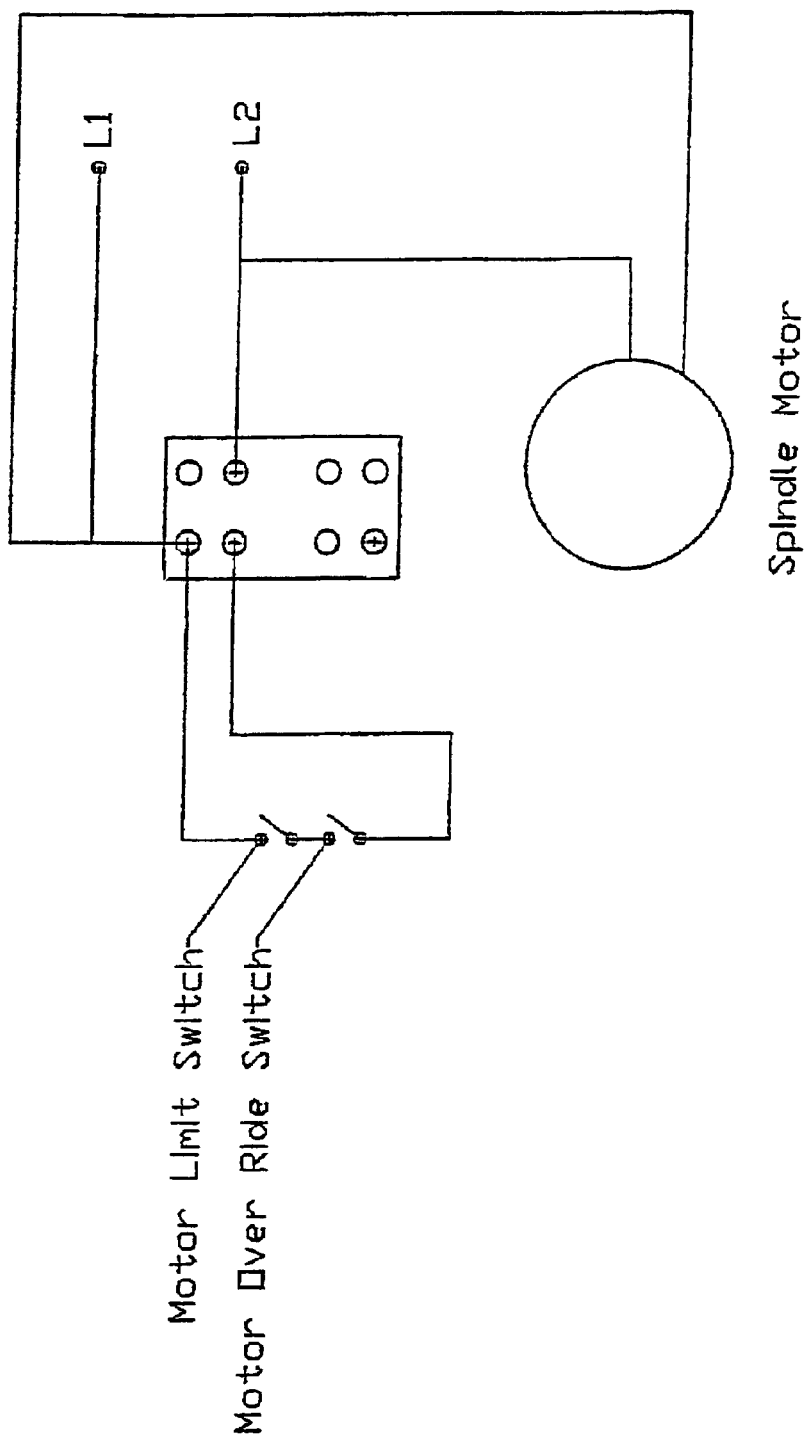

FIG. 18 is a schematic diagram of the electronic circuitry for the motor for controlling the spindle. This circuit accepts input from the motor limit switch and motor override switches which is directed to controller one, which governs the operation of the spindle motor.

Figure 19:
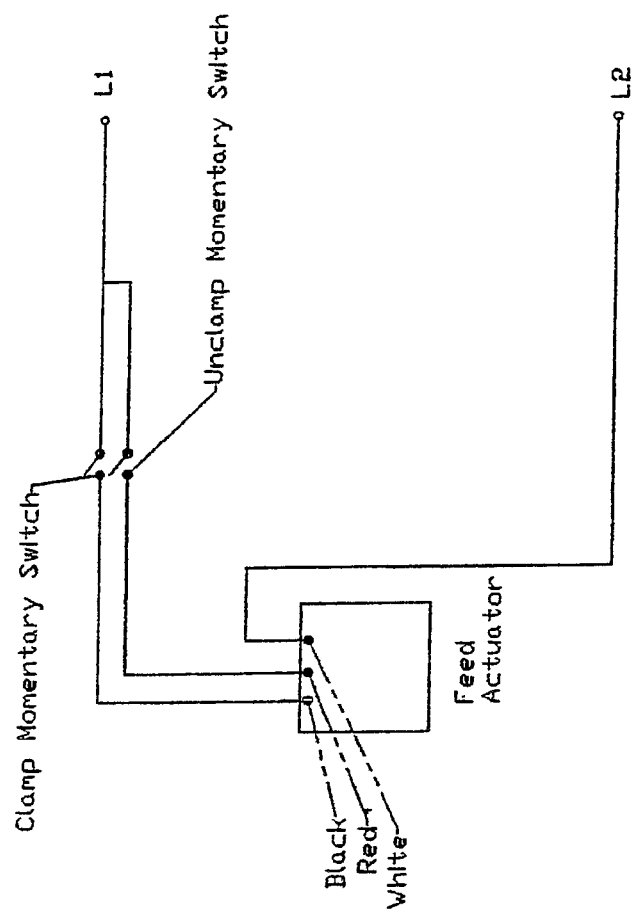

FIG. 19 is an electrical diagram of the circuitry for the linear actuator for moving the spindle head. This figure presents a detail of a portion of FIG. 17. This detail presents the momentary switches which control the clamping/un-clamping of the hard drive during shredding. The clamps described here hold the hard drive securely during engagement with the cutter.

Figure 20:
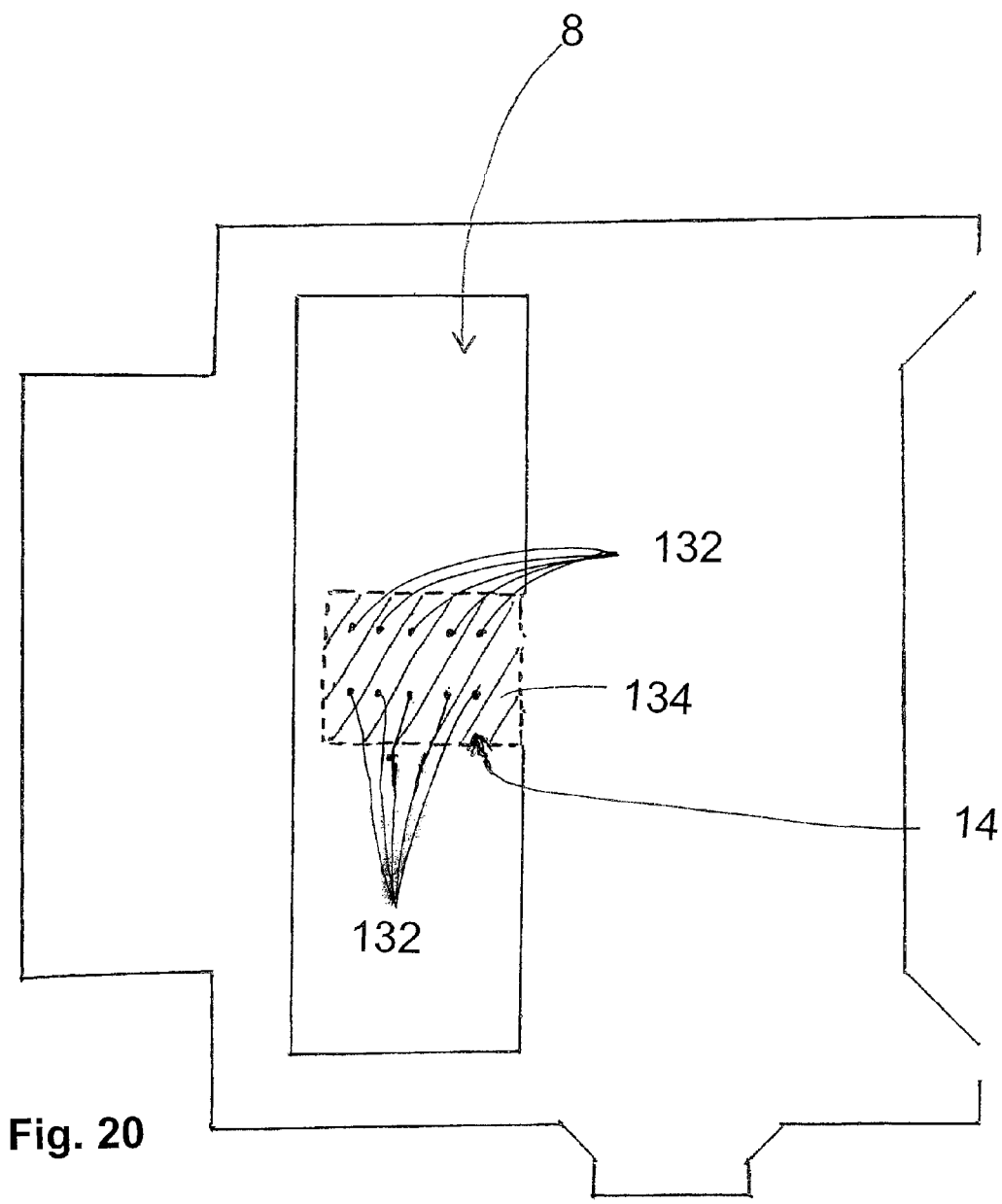
FIG. 20 is a schematic side view of a cutting chamber showing another aspect of the present disclosure.
Figure 21:
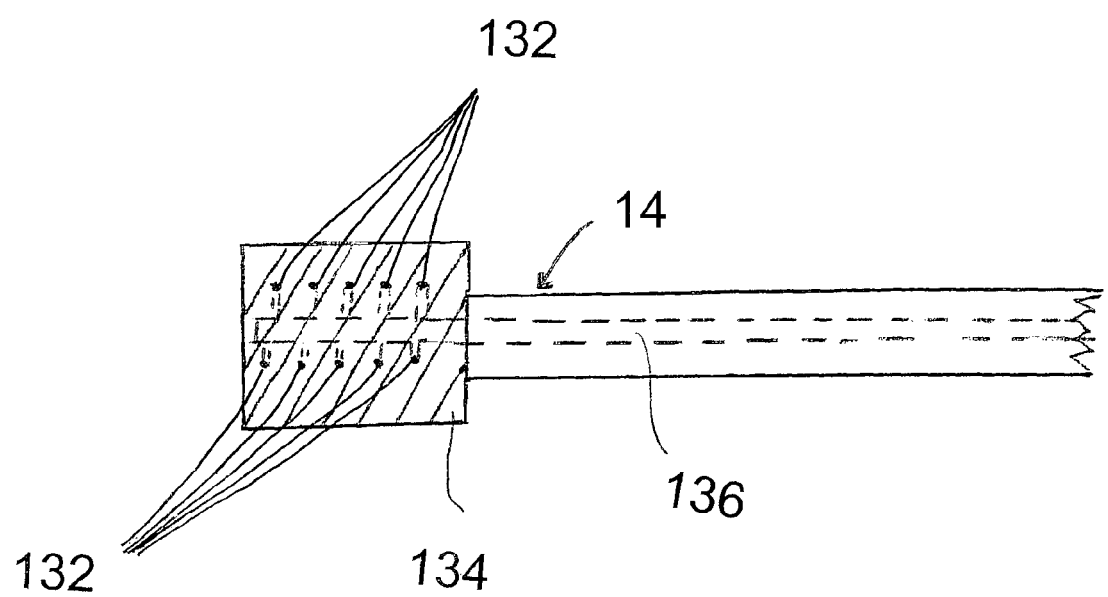
FIG. 21 is a schematic side view of the cutting tool used with the aspect shown in FIG. 20.

FIGS. 20 and 21 show one method of providing cooling to reduce the temperature of the hard drive during processing. The mill cutter 14 or other appropriate cutting tool which is adapted to shred the hard drive in the cutting chamber 8 is provided with holes 132 in the periphery of its cutting edge 134. These holes 132 communicated with a passageway 136 in the cutter 14 that is connected to a source of cold air. During the cutting operation, cold air is forced out of the holes 132 to cool the hard drive.

Figure 22:
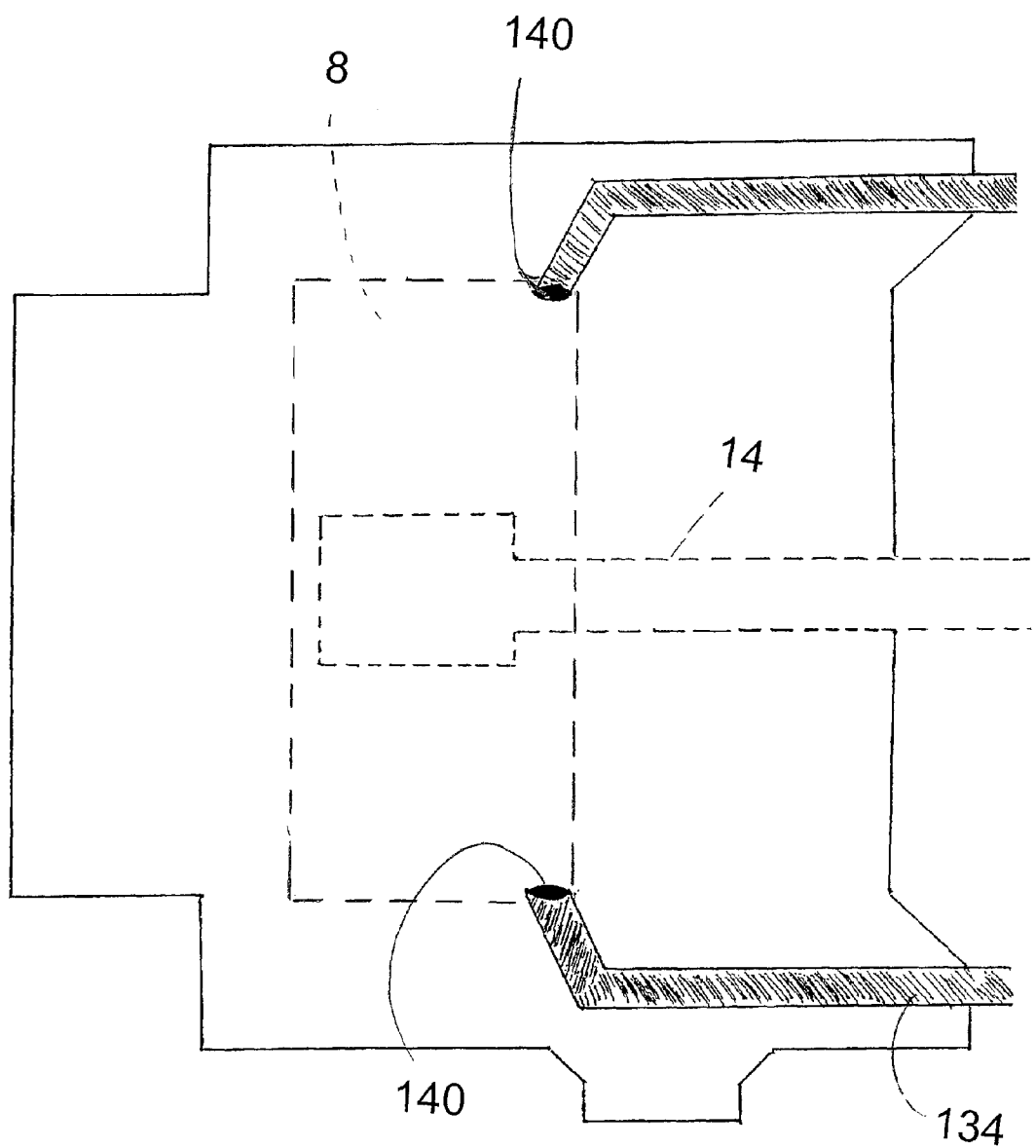
FIG. 22 is a back view of a cutting chamber showing still another aspect of the present disclosure.

FIG. 22 shows an arrangement in which cold air is force directly into the cutting chamber 8. Cold air ducts 138 are provided which have an outlet 140 opening directly into the chamber 8. The cold air ducts 138 are connected to a source of pressurized cold air (not shown) whereby cold air is forced through the ducts 138 into the cutting chamber 8.

Figure 23:
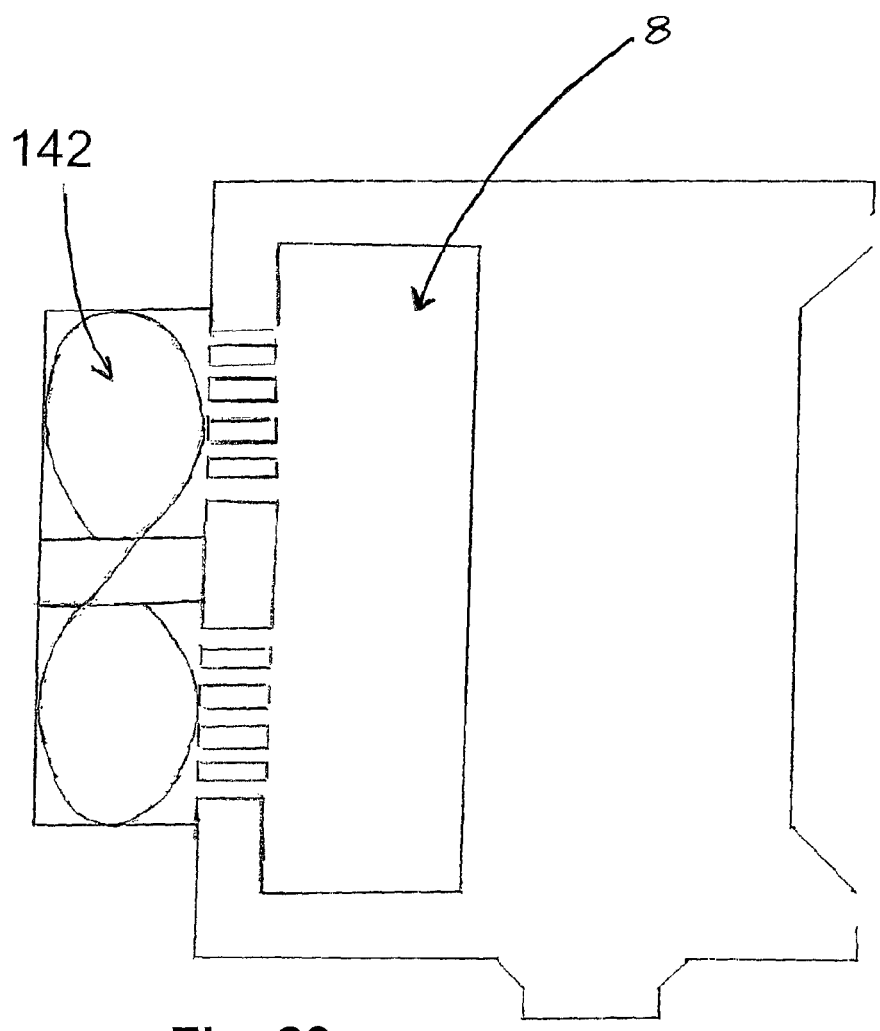
FIG. 23 is a side view of a cutting chamber showing a further aspect of the present disclosure.

FIG. 23 shows a cooling fan 142 used for cooling the chamber 8. The fan 142 is mounted to the side of the chamber 8 which has passages 144 therein providing air flow from the chamber 8 through the fan 142 into the atmosphere. Running of the fan draws hot air from the chamber during the shredding operation.

Figure 24:
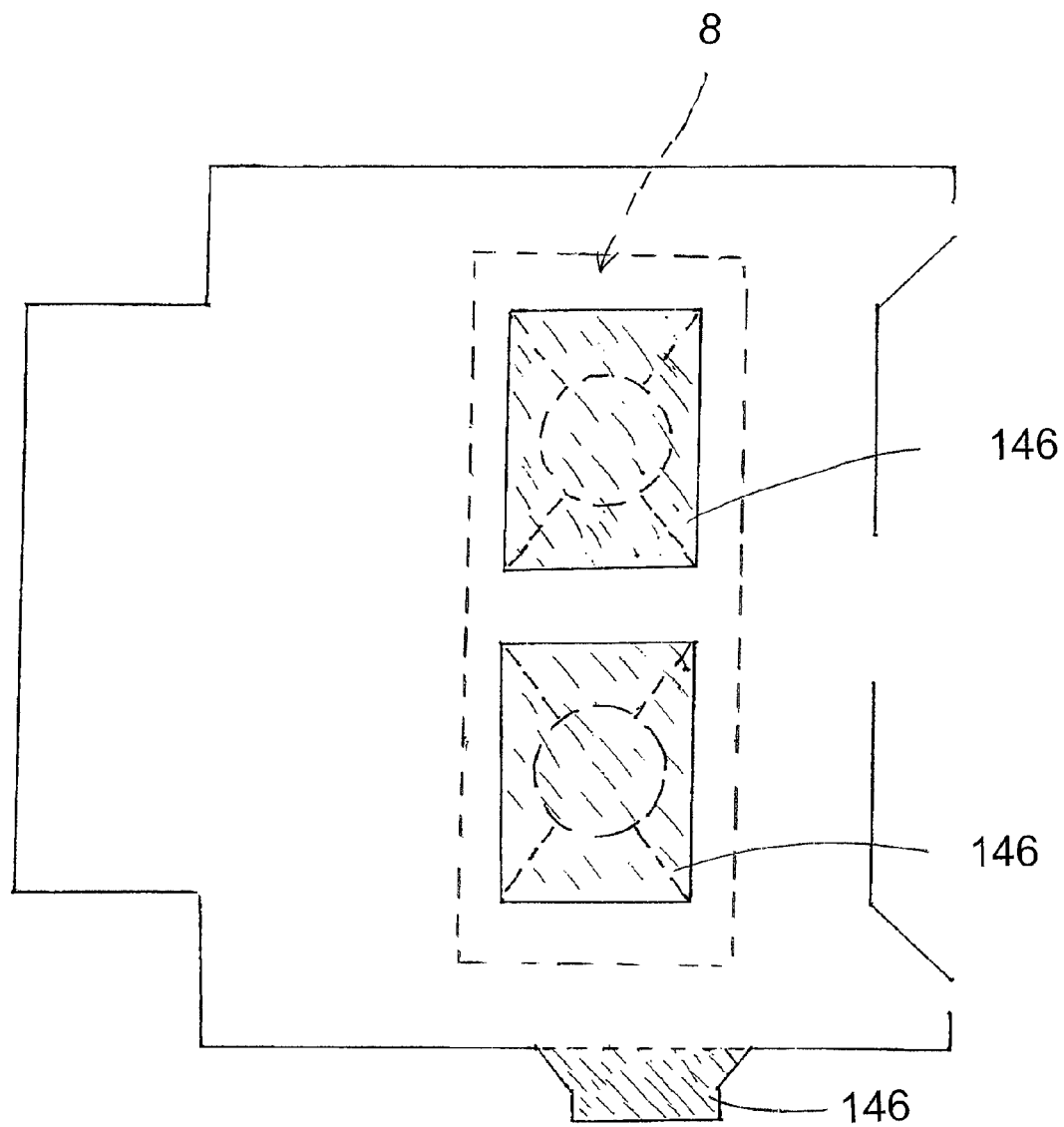
FIG. 24 is a back view showing a still further aspect of the present disclosure.

FIG. 24 shows the provision of vacuum ducts 146 which are provided at the bottom and side of the cutting chamber 8 in communication therewith. The ducts 146 are connected to a vacuum source so that during the shredding operation, the vacuum can draw the hot air out of the chamber 8. The vacuum ducts 146 may also serve to remove the metal shavings from the chamber and draw them into a collection chamber (not shown).

While FIGS. 21-24 shown different arrangements to cool the hard drive during processing, it is to be understood that any one or combination of them can be used.

Figure 25:
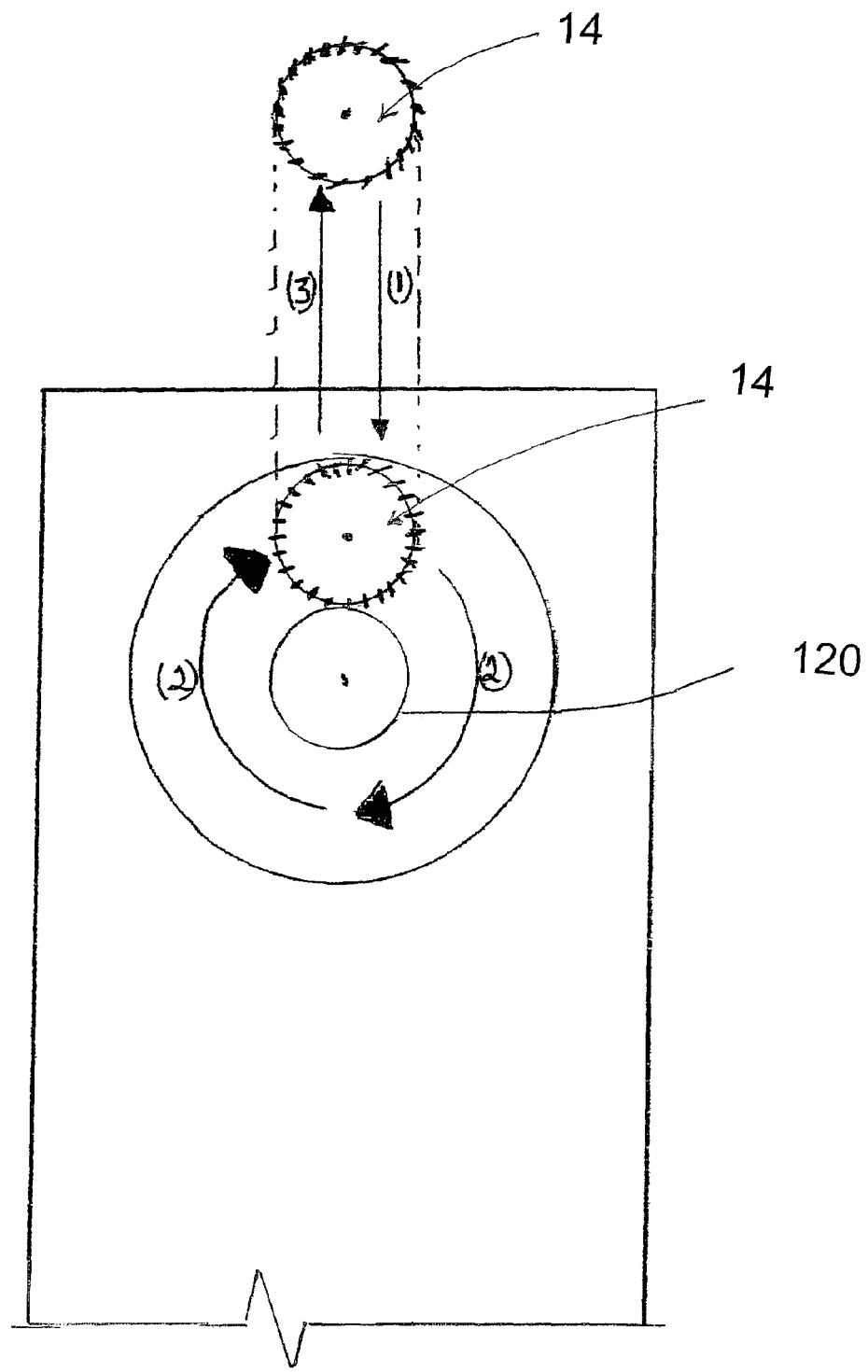
FIG. 25 is a schematic side view showing still another aspect of the present disclosure.

FIG. 25 shows schematically another method of operating the shredder. A single cutting tool 150 is mounted in a suitable mechanism that is guided in a track to move the cutting tool 150 toward the hub 120 of the hard drive 118. Once the rotating cutting blade pierces the outer portion of the hard drive 118 and reaches the platter hub 120, moving along the path indicated by the arrows (1), the cutting tool 150 follows a clockwise 360-degree cutting track around the platter hub 120, indicated by arrows (2), shredding the hard drive 118 platters 126 so that the only thing that remains of the hard drive platters 126 are small metal shavings. Once the cutting tool 150 has completed the 360-degree cutting path around the hub 120, the cutting tool 150 returns to the start position along the path indicated by arrows (3), and the shredder automatically shuts off.

Figure 26:
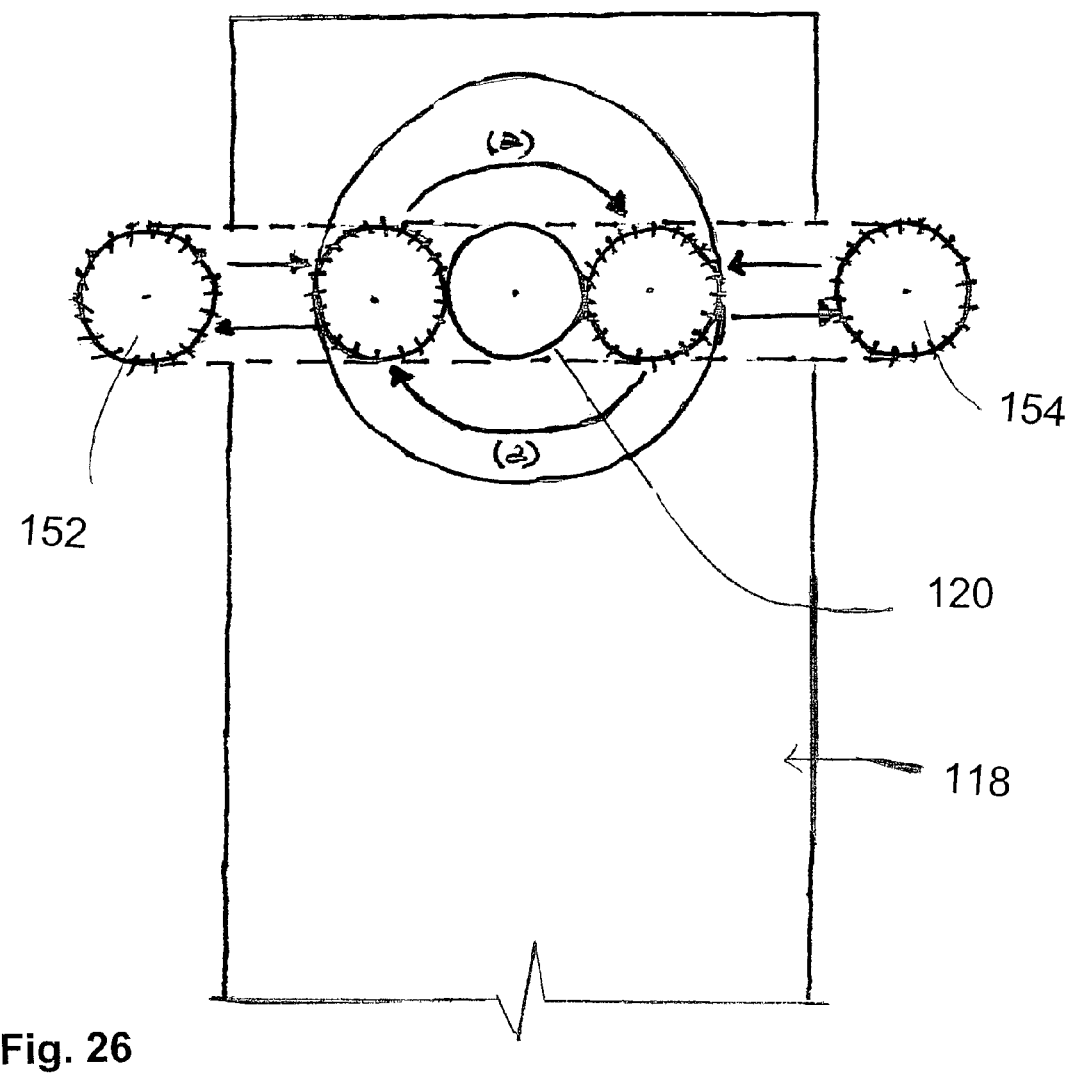
FIG. 26 is a schematic side view showing a yet another aspect of the present invention.
Figure 27:
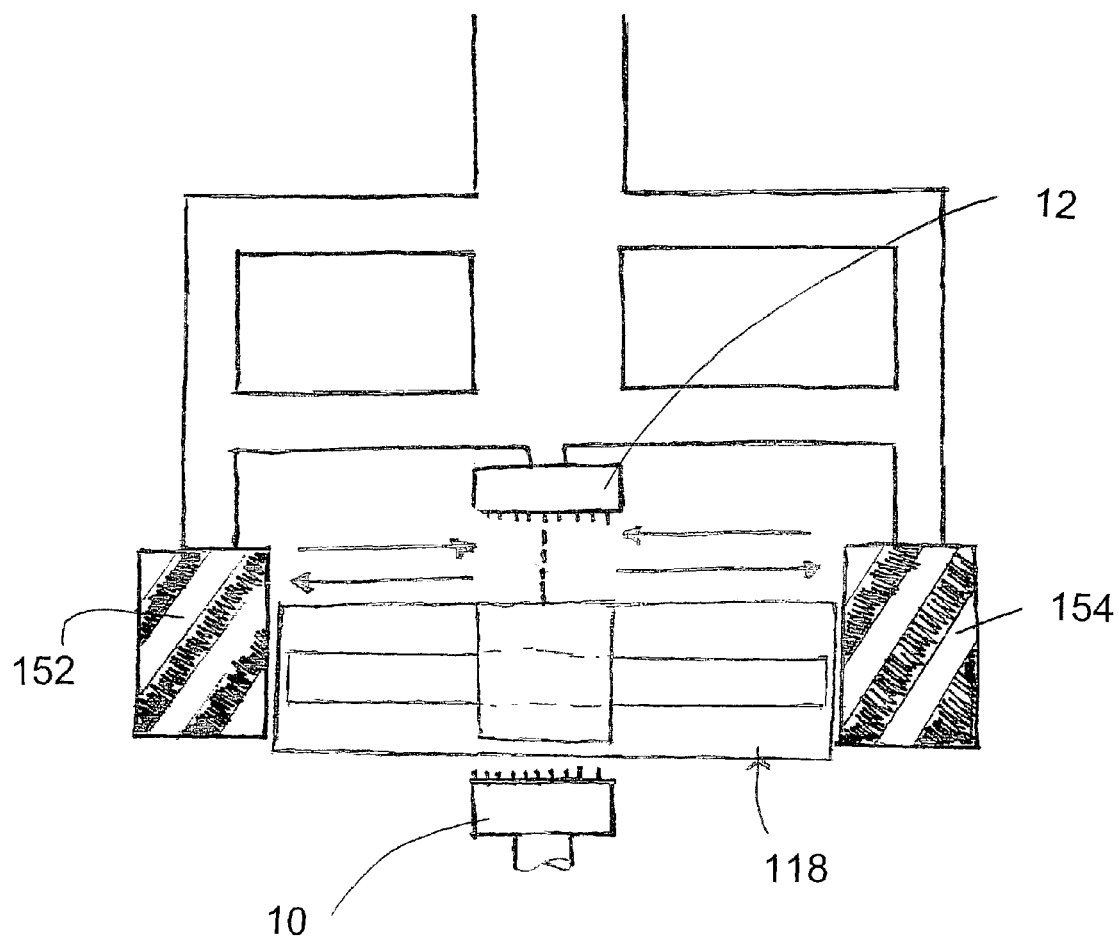
FIG. 27 is a schematic top view of the aspect shown in FIG. 26.

FIGS. 26 and 27 show schematically yet another method of operating the shredder utilizing two cutting tools 152 and 154. As shown, the cutting tools 152 and 154 are mounted one to either side of the hard drive 118. The cutting tools 152 and 154 are mounted on suitable mechanisms that can be moved in tracks to move each cutting tools 152 and 154 toward the hub 120 of the hard drive 118. Once the rotating cutting blades 152 and 154 pierce the outer portions of the hard drive 118 and reach the platter hub 120, the mechanisms move the cutting tools 152 around an axis extending through the center of the hub 120 as shown. The cutting tool 152 is moved clockwise from nine to three o'clock and the other cutting tool 154 is moved clockwise from three to nine o'clock around the platter hub 120 as indicated by the arrows (2) leaving only shavings.

Once the cutting tools 152 and 154 complete the 180-degree cutting path around the platter hub 120, the movement of the cutting tools 152 and 154 is reversed and the cutting tools 152 and 154 are returned to their original position and the shredder automatically shuts off.

A slight modification to the embodiment of FIGS. 26 and 27 is for the cutting tools 152 and 154 to be mounted in a mechanism above the hard drive. In this case, the cutting tools 152 and 154 bore into the hard drive 118 from the top rather than enter from the sides of the hard drive 118 before starting their move around the hub 120.

While the disclosure includes a number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A method of destroying data on a hard drive including a casing mounting at least one platter on which data is stored surrounding a central hub comprising:
   providing a rotatable cutting tool;
   advancing said cutting tool into said casing toward said hub;
   rotating either said hard drive or said cutting tool about the axis of said hub;
   shredding said at least one platter; and
   leaving at least substantially all of said hub and at least a portion of the casing unshredded.

2. The method of claim 1 wherein said cutting tool is advanced into said casing from the side toward said hub until it is adjacent said hub, and said hard drive is rotated about the axis of said hub while said cutting tool is rotating to shred the platters.

3. The method of claim 1 wherein said rotating cutting tool is advanced into said casing from the side toward said hub and said cutting tool is moved along a 360° cutting track around the hub while said cutting tool is rotating to shred the platters.

4. The method of claim 3 wherein said rotatable cutting tool is returned to its original position after completing the shredding of the at least one platter.

5. The method of claim 1 wherein two rotating cutting tools, one positioned on each side of said hard drive, are provided and said rotatable cutting tools are advanced into said casing toward said hub until said rotatable cutting tools are adjacent said hub, and said rotatable cutting tools are moved along an 180° cutting track around said hub while rotating to shred said platters.

6. The method of claim 1 wherein said hard drive is cooled while being shredded.

7. The method of claim 6 wherein cool air is forced onto the hard drive while being shredded.

8. The method claim 1 wherein a vacuum is applied to the hard drive while it is being shredded.

9. The method of claim 1 further including clamping said hard drive between a thrust spindle and spindle head while said at least one platter is being shredded.

10. The method of claim 9 further including rotating said spindle head during said shredding process.

\* \* \* \* \*